(12) United States Patent
Sakairi et al.

(10) Patent No.: US 11,971,633 B2
(45) Date of Patent: Apr. 30, 2024

(54) ELECTRODE STRUCTURE, LIQUID CRYSTAL DISPLAY DEVICE, PROJECTIVE DISPLAY DEVICE, AND METHOD OF MANUFACTURING ELECTRODE STRUCTURE

(71) Applicants: SONY SEMICONDUCTOR SOLUTIONS CORPORATION, Kanagawa (JP); SONY GROUP CORPORATION, Tokyo (JP)

(72) Inventors: Takashi Sakairi, Kanagawa (JP); Tomoaki Honda, Tokyo (JP); Tsuyoshi Okazaki, Tokyo (JP); Keiichi Maeda, Kanagawa (JP); Chiho Araki, Kumamoto (JP); Katsunori Dai, Kumamoto (JP); Shunsuke Narui, Kumamoto (JP); Kunihiko Hikichi, Kumamoto (JP); Kouta Fukumoto, Kanagawa (JP); Toshiaki Okada, Kumamoto (JP); Takuma Matsuno, Kumamoto (JP);
(Continued)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 201 days.

(21) Appl. No.: 17/615,984

(22) PCT Filed: May 15, 2020

(86) PCT No.: PCT/JP2020/019548
§ 371 (c)(1),
(2) Date: Dec. 2, 2021

(87) PCT Pub. No.: WO2020/250623
PCT Pub. Date: Dec. 17, 2020

(65) Prior Publication Data
US 2022/0326578 A1     Oct. 13, 2022

(30) Foreign Application Priority Data

Jun. 10, 2019   (JP) .................................. 2019-107985

(51) Int. Cl.
*G02F 1/1343*     (2006.01)
*G02F 1/1335*     (2006.01)
*G02F 1/1337*     (2006.01)

(52) U.S. Cl.
CPC .. *G02F 1/134318* (2021.01); *G02F 1/133528* (2013.01); *G02F 1/133707* (2013.01)

(58) Field of Classification Search
CPC ......... G02F 1/133528; G02F 1/133707; G02F 1/133502; G02F 1/134336; G02F 1/136277; G02F 1/134318; G03B 21/00
See application file for complete search history.

(56) References Cited

U.S. PATENT DOCUMENTS 5,497,255 A * 3/1996 Yamazaki ......... G02F 1/134336
                                             349/114
6,190,936 B1 * 2/2001 Moore .............. G02F 1/133553
                                             438/30
(Continued)

FOREIGN PATENT DOCUMENTS

JP   4-338721 A    11/1992
JP   11-344726 A   12/1999
(Continued)

OTHER PUBLICATIONS

International Search Report and Written Opinion of PCT Application No. PCT/JP2020/019548, dated Jun. 23, 2020, 08 pages of ISRWO.

*Primary Examiner* — Hoan C Nguyen
(74) *Attorney, Agent, or Firm* — CHIP LAW GROUP

(57) ABSTRACT

An electrode structure includes: a plurality of pixel electrodes arranged separately from each other; and a plurality
(Continued)

of dielectric layers laminated in a first direction with respect to the plurality of pixel electrodes, in which the plurality of dielectric layers includes: a first dielectric layer that spreads over the plurality of pixel electrodes in a direction intersecting with the first direction; and a second dielectric layer that includes dielectric material having a refractive index higher than that of the first dielectric layer, sandwiches the first dielectric layer together with the plurality of pixel electrodes, and has a slit at a position overlapping space between pixel electrodes adjacent when viewed from the first direction.

18 Claims, 36 Drawing Sheets

(72) Inventors: Yuu Kawaguchi, Kumamoto (JP); Yuuji Adachi, Kumamoto (JP); Koichi Amari, Tokyo (JP); Hideki Kawaguchi, Kumamoto (JP); Seiya Haraguchi, Kumamoto (JP); Takayoshi Masaki, Kumamoto (JP); Takuya Fujino, Kumamoto (JP); Tadayuki Dofuku, Kumamoto (JP); Yosuke Takita, Kumamoto (JP); Kazuhiro Tamura, Kumamoto (JP); Atsushi Tanaka, Kumamoto (JP)

(56) References Cited

U.S. PATENT DOCUMENTS

| | | | | |
|---|---|---|---|---|
| 6,493,052 | B1* | 12/2002 | Satake | G02F 1/133553 349/114 |
| 6,686,985 | B1* | 2/2004 | Tanaka | G02F 1/133514 349/143 |
| 2003/0020854 | A1 | 1/2003 | Satake et al. | |
| 2003/0058392 | A1* | 3/2003 | Satake | G02F 1/133553 349/114 |
| 2007/0287211 | A1* | 12/2007 | Wu | G02F 1/133553 438/30 |
| 2008/0151132 | A1 | 6/2008 | Oura et al. | |
| 2009/0128768 | A1* | 5/2009 | Kar-Roy | G02F 1/136277 438/30 |
| 2010/0079691 | A1* | 4/2010 | Yoshii | G09G 3/3648 349/39 |
| 2018/0088396 | A1* | 3/2018 | Sakairi | G02F 1/134309 |
| 2019/0369448 | A1 | 12/2019 | Sakairi et al. | |

FOREIGN PATENT DOCUMENTS

| | | |
|---|---|---|
| JP | 2000-199899 A | 7/2000 |
| JP | 2008-158395 A | 7/2008 |
| TW | 201816485 A | 5/2018 |
| WO | 2018/74219 A1 | 4/2018 |

\* cited by examiner

FIG.6
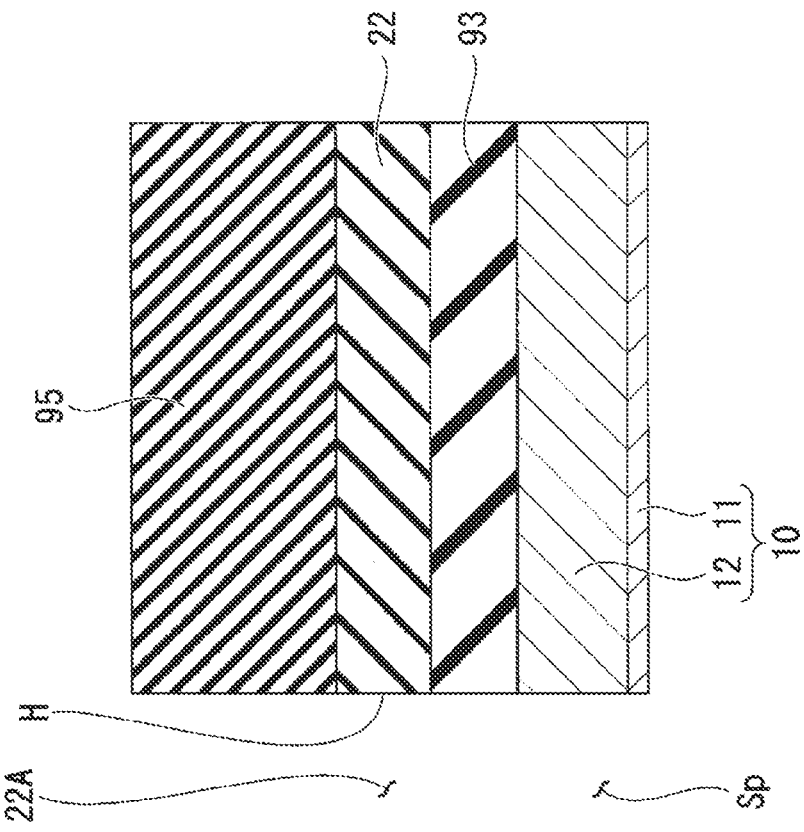
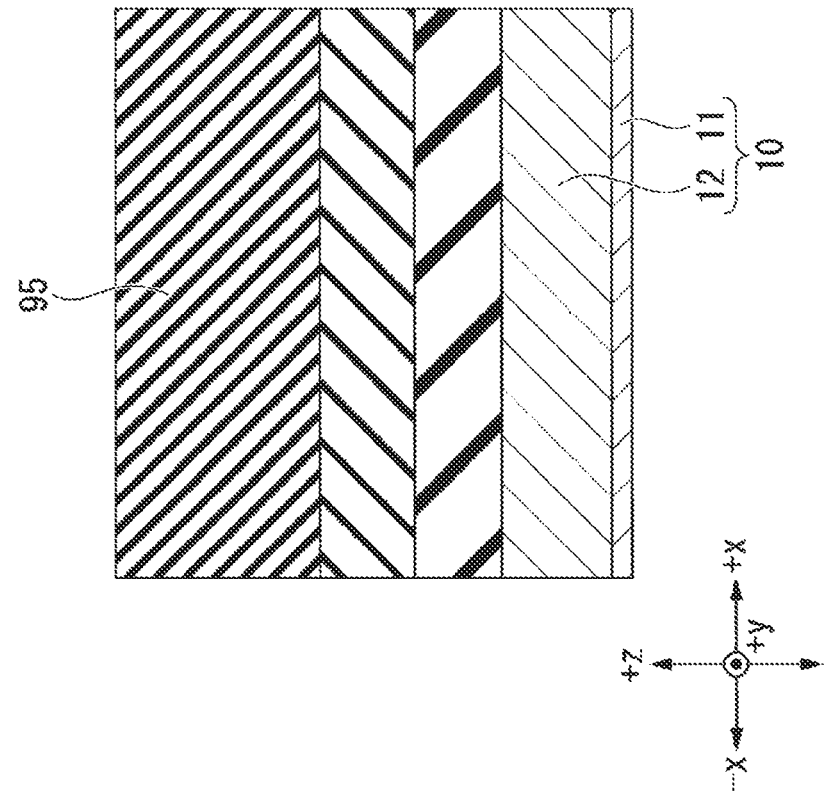

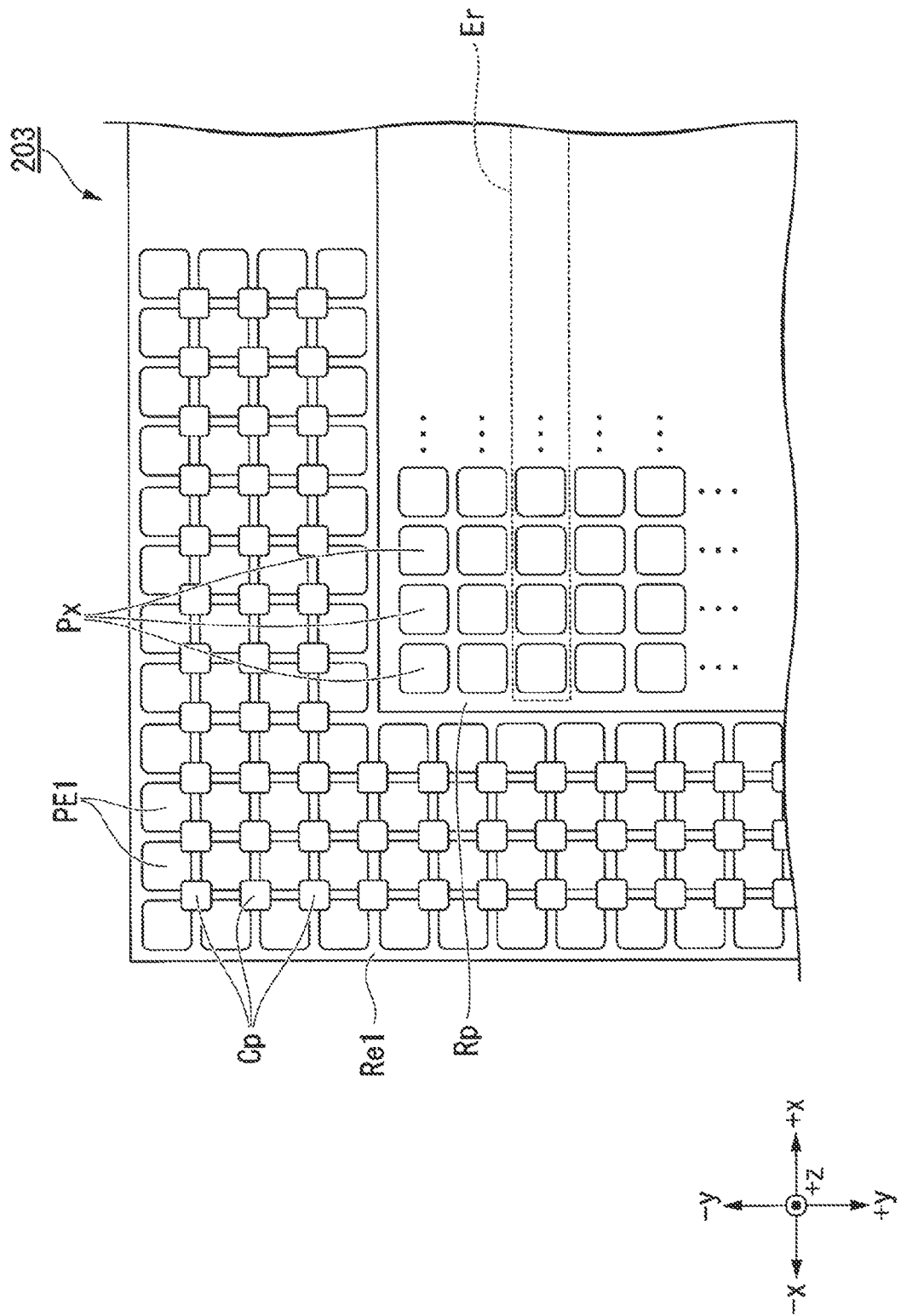

ELECTRODE STRUCTURE, LIQUID CRYSTAL DISPLAY DEVICE, PROJECTIVE DISPLAY DEVICE, AND METHOD OF MANUFACTURING ELECTRODE STRUCTURE

CROSS REFERENCE TO RELATED APPLICATIONS

This application is a U.S. National Phase of International Patent Application No. PCT/JP2020/019548 filed May 15, 2020, which claims priority benefit of Japanese Patent Application No. JP 2019-107985 filed in the Japan Patent Office on Jun. 10, 2019. Each of the above-referenced applications is hereby incorporated herein by reference in its entirety.

FIELD

The present disclosure relates to an electrode structure, a liquid crystal display device, a projective display device, and a method of manufacturing the electrode structure.

BACKGROUND

A reflective liquid crystal display device using a pixel electrode that has a function of both light reflection and liquid crystal control is known as a liquid crystal display device used for a projective display device. In the reflective liquid crystal display device, the pixel electrode turns on/off reflection of incident light by using polarization of a liquid crystal.

A reflective liquid crystal display device can be provided with a wire and the like on a side opposite to a light incident direction, and is said to be suitable for resolution enhancement as compared with a transmissive liquid crystal display device. Furthermore, the reflective liquid crystal display device can halve an optical path length required for polarization as compared with the transmissive liquid crystal display device, and can be operated with a small drive voltage.

For example, Patent Literature 1 describes a reflective liquid crystal display device. Patent Literature 1 describes a multilayer film of dielectric layers provided on a reflective pixel electrode in order to enhance light utilization efficiency. Furthermore, the reflective liquid crystal display device includes a plurality of pixel electrodes. The plurality of pixel electrodes is separated from each other with space interposed therebetween in order to independently control liquid crystals located immediately above. The space between the plurality of pixel electrodes cannot reflect incident light, which causes a decrease in reflectance. In Patent Literature 1, a light shielding film for inhibiting leakage light is provided in the space between the plurality of pixel electrodes.

CITATION LIST

Patent Literature

Patent Literature 1: JP H4-338721 A

SUMMARY

Technical Problem

The reflectance of a reflective liquid crystal display device has a potent influence on the luminance of an output image. Improvement of the reflectance of a reflective liquid crystal display device improves the image quality of the output image. Therefore, further improvement of utilization efficiency of light incident on the liquid crystal display device is required.

The present disclosure has been made in view of the above-described circumstances, and provides an electrode structure, a liquid crystal display device, a projective display device, and a method of manufacturing the electrode structure capable of improving light utilization efficiency.

Solution to Problem

An electrode structure according to the first embodiment of the present disclosure includes: a plurality of pixel electrodes arranged separately from each other; and a plurality of dielectric layers laminated in a first direction with respect to the plurality of pixel electrodes, in which the plurality of dielectric layers includes: a first dielectric layer that spreads over the plurality of pixel electrodes in a direction intersecting with the first direction; and a second dielectric layer that includes dielectric material having a refractive index higher than that of the first dielectric layer, sandwiches the first dielectric layer together with the plurality of pixel electrodes, and has a slit at a position overlapping space between pixel electrodes adjacent when viewed from the first direction.

Effects

A part of light incident on the electrode structure passes through the slit of the second dielectric layer. When being incident on the first dielectric layer, the light that has passed through the slit of the second dielectric layer comes around to the back side of the second dielectric layer as viewed from a light incident direction. That is, the light that has passed through the slit of the second dielectric layer is diffracted at the boundary with the first dielectric layer. The slit of the second dielectric layer is located at a position overlapping space between a plurality of pixel electrodes. The diffraction phenomenon reduces an amount of light that reaches the space.

BRIEF DESCRIPTION OF DRAWINGS

FIG. 6 is a cross-sectional view for illustrating the first method of manufacturing the electrode structure according to the first embodiment.

FIG. 36 is a plan view of a liquid crystal display device according to a ninth embodiment.

DESCRIPTION OF EMBODIMENTS

Figure 1:
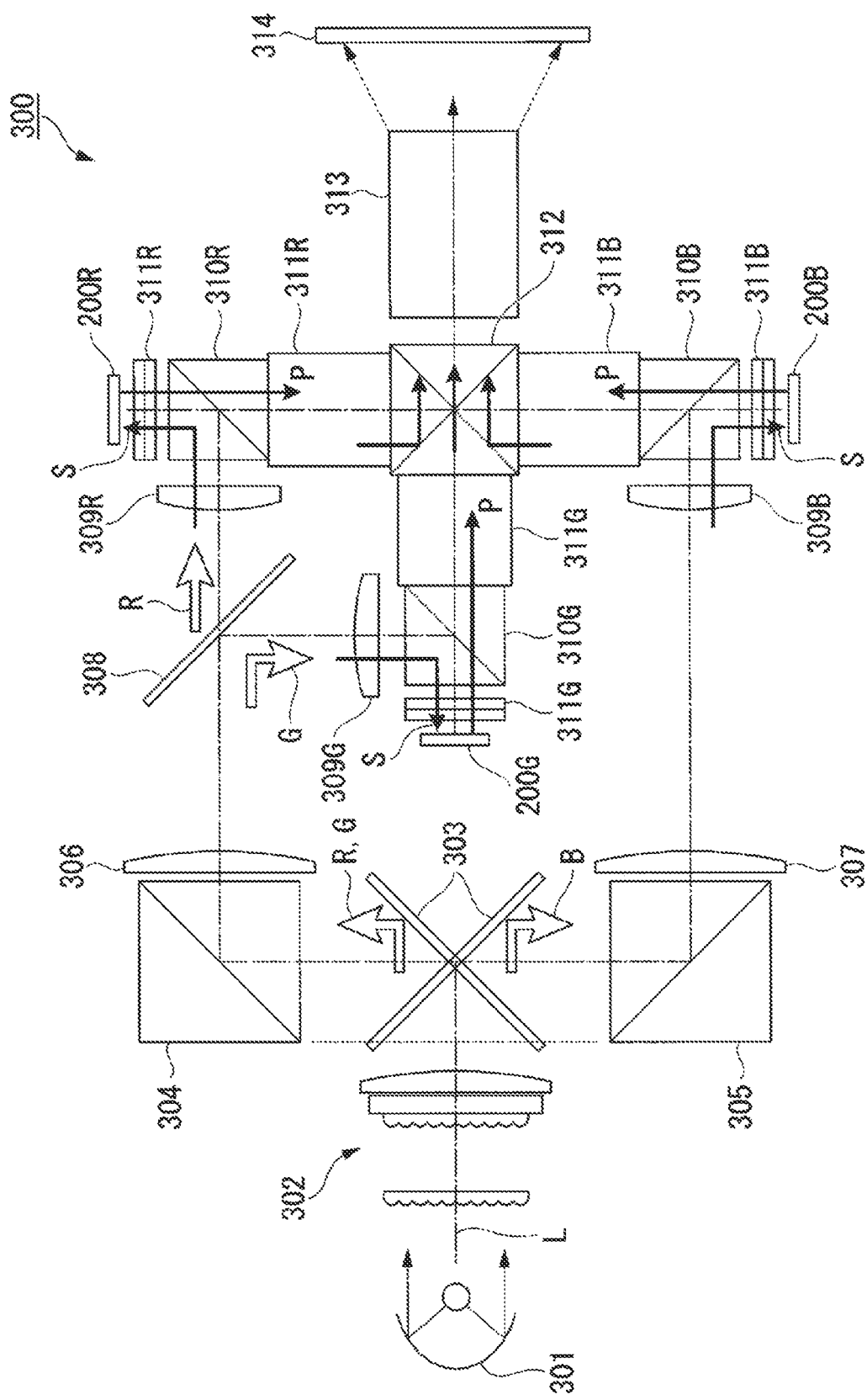
FIG. 1 is a schematic view of a projective display device according to a first embodiment.

Hereinafter, embodiments will be described in detail appropriately with reference to the drawings. In the drawings used in the following description, in order to facilitate understanding of characteristics, a characteristic part may be illustrated in an enlarged manner for convenience. The dimensional ratio and the like of each component may be different from the actual dimensional ratio and the like. The materials, dimensions, and the like illustrated below are examples, and the present disclosure is not limited thereto. The materials, dimensions, and the like can be appropriately changed and implemented within the scope in which the effects of the present disclosure are exhibited.

In the following description, an orthogonal coordinate system of x, y, and z will be appropriately used. An x direction is one example of a second direction to be described later. A y direction is one example of a third direction to be described later. A z direction is one example of a first direction to be described later. In each direction, + and − are added to indicate one direction and the opposite direction.

First Embodiment

"Projective Display Device"

FIG. 1 is a schematic view of a projective display device 300 according to a first embodiment. The projective display device 300 modulates light (illumination light) output from a light source for each of RGB colors and combines the modulated beams of light based on an image signal to generate image light. For example, the projective display device 300 is used for a projector, a device for projecting an image on a screen unit of a head-up display, and the like. The projective display device 300 in FIG. 1 is a so-called three-plate type reflective projector that displays a color image by using three reflective liquid crystal display devices 200R, 200G, and 200B for colors of red, blue, and green. Although an example of the three-plate type reflective projector for three colors of red, blue, and green will be described below, a two-plate type reflective projector and a single-plate type reflective projector may be used. The two-plate type reflective projector controls two colors of red, blue, and green with one liquid crystal display device. The single-plate type reflective projector controls three colors with one liquid crystal display device by using a field sequential method and the like.

The projective display device 300 includes, for example, a light source 301, an integrator 302, and a dichroic mirror 303 (wavelength selecting element) in a light traveling order along an optical axis L. The light source 301 emits, for example, white light including red light R, blue light B, and green light G. The light source 301 is, for example, a solid light source including a lamp, such as a halogen lamp, a metal halide lamp, and a xenon lamp, a laser diode (LD), a light emitting diode (LED), and the like. Furthermore, the light source 301 may separately emit light for each wavelength band. The integrator 302 includes, for example, a PS converter and the like. The integrator 302 equalizes light from the light source 301, and increases light utilization efficiency. The dichroic mirror 303 separates white light into red light R, blue light B, and green light G, for example.

The projective display device 300 includes a polarization beam splitter 304, a condenser lens 306, and a dichroic mirror 308 in a light traveling order on optical paths for red light R and green light G. Furthermore, the projective display device 300 includes a polarization beam splitter 305 and a condenser lens 307 in a light traveling order on an optical path for blue light B. The polarization beam splitters 304 and 305 selectively reflects light having a predetermined polarization component among incident light. The dichroic mirror 308 separates incident red light R and green light G.

The polarization beam splitters 304 and 305 may be provided between the condenser lens 306 and condenser lenses 309R and 309G and between the condenser lens 307 and a condenser lens 309B. In this case, mirrors are disposed at the positions of the polarization beam splitters 304 and 305 in FIG. 1.

The projective display device 300 includes, for example, condenser lenses 309R, 309G, and 309B, polarization beam splitters 310R, 310G, and 310B, ¼ wavelength plates 311R, 311G, and 311B, and liquid crystal display devices 200R, 200G, and 200B in order from the light incident side on optical paths after separation into red light R, green light G, and blue light B.

Each of the polarization beam splitters 310R, 310G, and 310B has a polarization selection surface. For example, the polarization selection surface reflects incident light having a predetermined polarization component (S-polarization component), and transmits light having a predetermined polarization component (P-polarization component). The S-deflection component incident on the polarization beam splitters 310R, 310G, and 310B is reflected by the deflection selection surface, and reaches the liquid crystal display devices 200R, 200G, and 200B. The P-deflection component reflected by the liquid crystal display devices 200R, 200G, and 200B is transmitted through the deflection selection surface, and emitted as light for image display. Although an example in which the S-deflection component is incident on the liquid crystal display devices 200R, 200G, and 200B, and the P-deflection component is emitted as light for image display has been described, the P-deflection component may be incident on the liquid crystal display devices 200R, 200G, and 200B, and the S-deflection component may be emitted as light for image display.

The ¼ wavelength plates 311R, 311G, and 311B are located between the polarization beam splitters 310R, 310G, and 310B and the liquid crystal display devices 200R, 200G, and 200B. The ¼ wavelength plates 311R, 311G, and 311B correct the polarization state of passing light, and generate a phase difference of nearly ¼ wavelength with respect to light of polarization components orthogonal to each other.

The projective display device 300 includes, for example, a cross dichroic prism 312, a projection lens 313, and a screen 314 on each optical path of light reflected from the liquid crystal display devices 200R, 200G, and 200B. The cross dichroic prism 312 combines color lights of predetermined polarization components selected by the polarization beam splitters 310R, 310G, and 310B, and emits the combined light. The cross dichroic prism 312 has, for example, three incident surfaces and one emission surface.

Spacers 311R, 311G, and 311B may be provided between a light incident surface of the cross dichroic prism 312 and light emission surfaces of the polarization beam splitters 310R, 310G, and 310B. The spacers 311R, 311G, and 311B inhibits stress distortion caused by temperature change of an optical element and the like. A polarization beam splitter or a dichroic prism may be disposed at the positions of the spacers 311R, 311G, and 311B. The polarization beam splitter cuts polarization leakage. The dichroic prism reflects light of an unintended wavelength.

The projection lens 313 is located between the emission surface of the cross dichroic prism 312 and the screen 314. The projection lens 313 projects the combined light emitted from the cross dichroic prism 312 toward the screen 314.

"Liquid Crystal Display Device"

Figure 2:
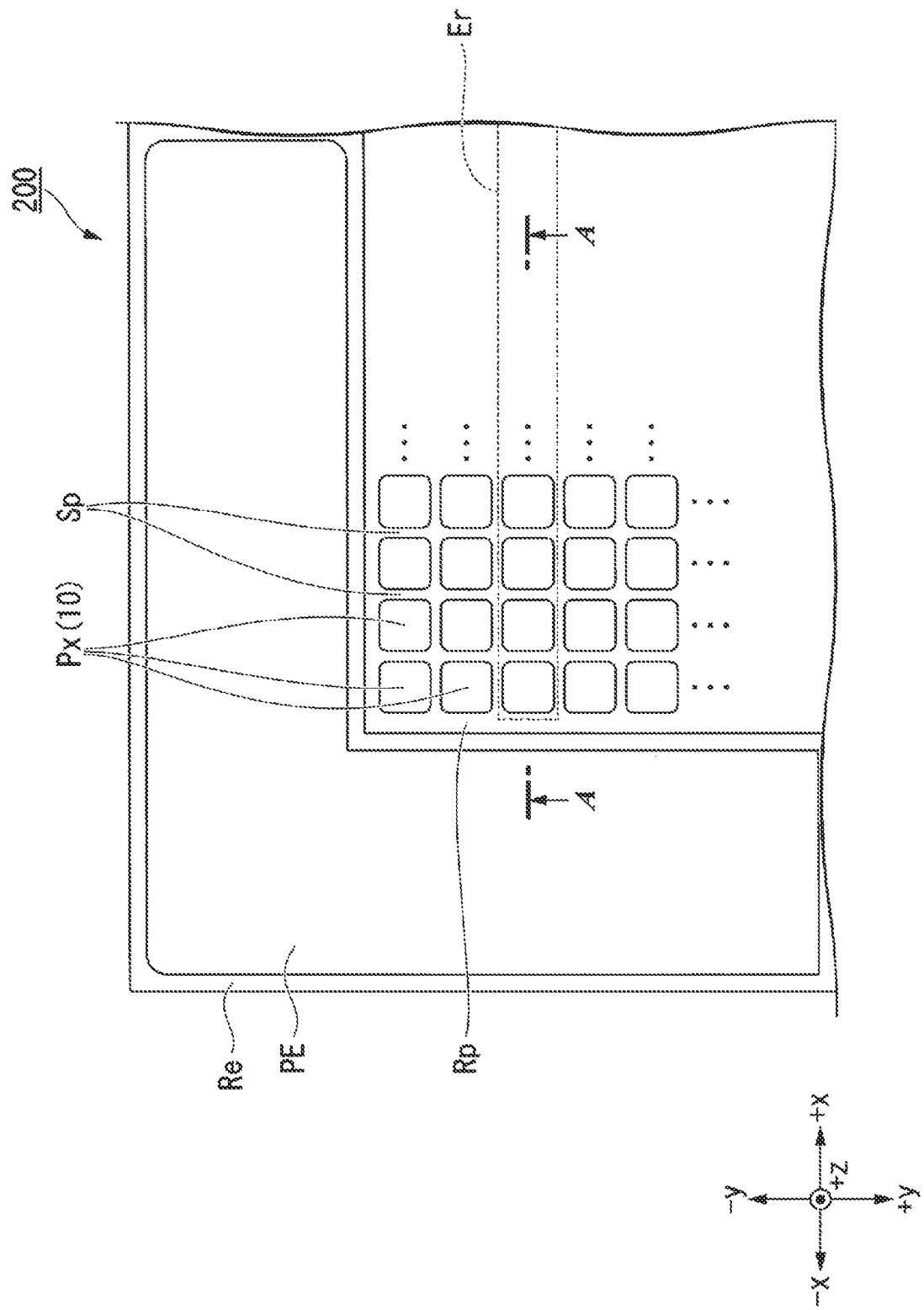
FIG. 2 is a plan view of a liquid crystal display device according to the first embodiment.

FIG. 2 is a plan view of a liquid crystal display device 200 according to the first embodiment. The liquid crystal display device 200 is one example of the liquid crystal display devices 200R, 200G, and 200B in FIG. 1. The liquid crystal display device 200 has a pixel region Rp and a peripheral region Re. In the pixel region Rp, a plurality of pixels Px is formed. The pixel region Rp has, for example, a plurality of electrode rows Er in the y direction. In the electrode rows Er, pixels Px are arranged in the x direction. The peripheral region Re surrounds the pixel region Rp in plan view from the z direction. The peripheral region Re includes, for example, one peripheral electrode PE.

Figure 3:
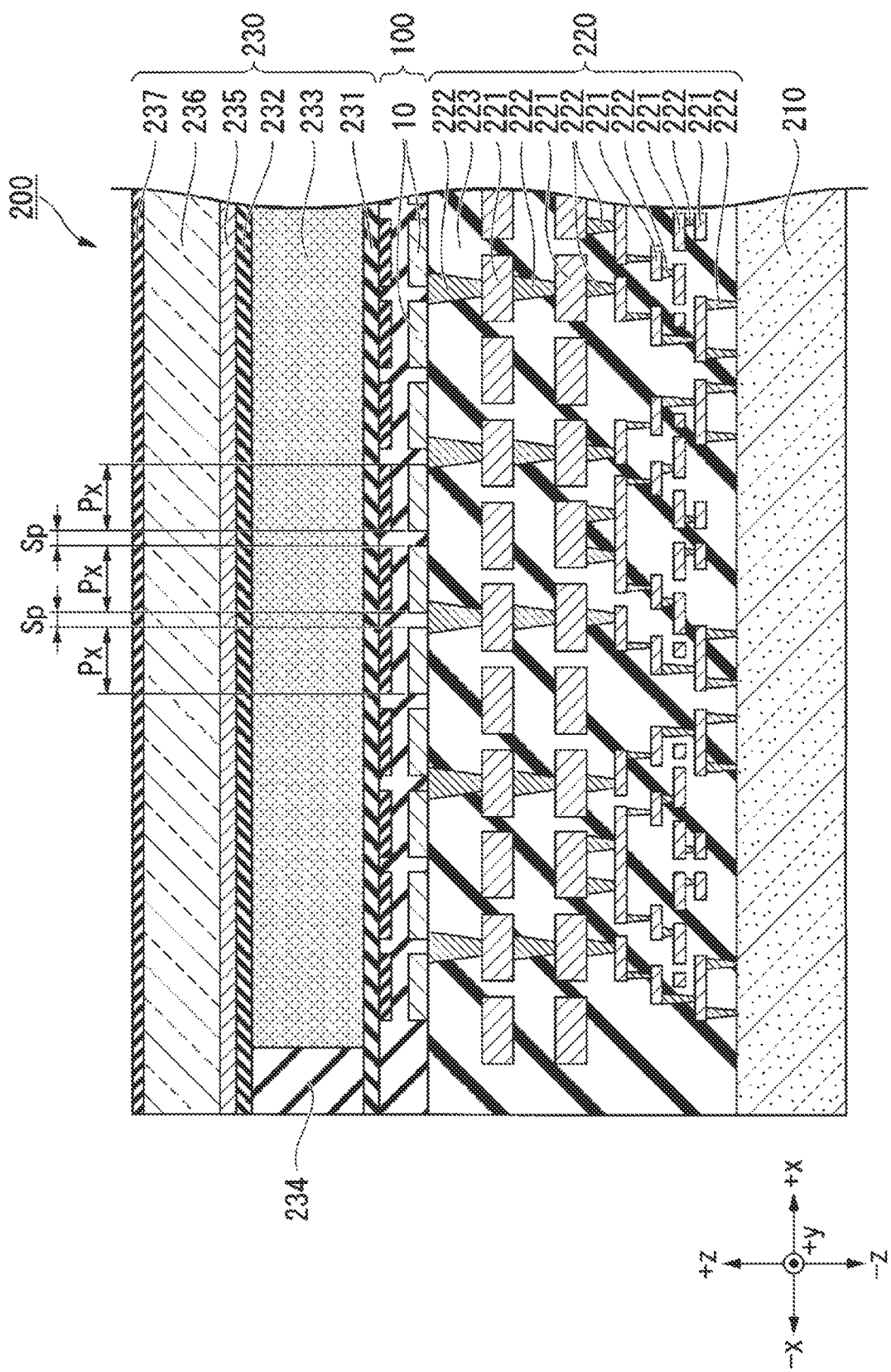
FIG. 3 is a cross-sectional view of the liquid crystal display device according to the first embodiment.

FIG. 3 is a cross-sectional view of the liquid crystal display device 200 according to the first embodiment. FIG. 3 is a cross-sectional view of the liquid crystal display device 200 cut along an A-A plane in FIG. 2. The liquid crystal display device 200 includes, for example, a substrate 210, a pixel circuit 220, an electrode structure 100, and a light controller 230. The light controller 230 is located closer to the polarization beam splitters 310R, 310G, and 310B (see FIG. 1) than the pixel circuit 220. Light is incident on the liquid crystal display device 200 from the side of the light controller 230.

The substrate 210 is, for example, a semiconductor substrate. The substrate 210 is, for example, a silicon substrate. The substrate 210 is provided with, for example, a control element (e.g., transistor) that drives the pixel circuit 220.

The pixel circuit 220 is located between the substrate 210 and the electrode structure 100. The pixel circuit 220 is located on the back surface of the electrode structure 100 with respect to the light incident direction. The pixel circuit 220 arranged on the back surface of the electrode structure 100 can inhibit the pixel circuit 220 from hindering traveling of incident light.

The pixel circuit 220 includes a plurality of wires 221, a plurality of plug wires 222, and an insulating layer 223. The wires 221 and the plug wires 222 are provided inside the insulating layer 223. The wires 221 extend in an xy plane. A plurality of wires 221 is provided in different layers in the z direction. The number of layers of the wires 221 in the z direction is not particularly limited. A wire 221 located in a certain layer is provided at, for example, a position overlapping space between wires in adjacent layers or space Sp between pixel electrodes 10 in the z direction. The configuration can reduce light that reaches the substrate 210, and enhance the light utilization efficiency. A plug wire 222 connects wires 221 at different height positions in the z direction. The wires 221 and the plug wires 222 contain material having high electrical conductivity, such as Al, Cu, and AlCu. The insulating layer 223 electrically insulates the plurality of wires 221 except for the plug wire 222. The insulating layer 223 is a so-called interlayer insulating film, and is made of, for example, $SiO_2$.

The light controller 230 includes, for example, alignment films 231 and 232, a liquid crystal layer 233, a sealing material 234, a common electrode 235, a counter substrate 236, and a polarization plate 237.

The alignment films 231 and 232 control the alignment state of liquid crystal molecules of the liquid crystal layer 233. The alignment films 231 and 232 are, for example, polyimide films. The alignment film 231 is in contact with the electrode structure 100.

The liquid crystal layer 233 is sandwiched between the two alignment films 231 and 232. The outer periphery of the liquid crystal layer 233 is sealed by the sealing material 234. The liquid crystal layer 233 has liquid crystal molecules. The liquid crystal molecules are liquid crystals of, for example, a vertical alignment (VA) type, a twisted nematic (TN) type, and an in plan switching (IPS) type. The orientations of liquid crystal molecules change in accordance with the potential between the pixel electrode 10 and the common electrode 235. The light transmittance of the liquid crystal layer 233 changes in accordance with the orientations of the liquid crystal molecules, and an image is formed. A portion overlapping the pixel electrode 10 in the z direction is one pixel Px.

The common electrode 235 sandwiches the liquid crystal layer 233 together with the pixel electrode 10. The common electrode 235 is electrically connected to the peripheral electrode PE formed in the peripheral region Re, and has an equal potential. The common electrode 235 transmits visible light, for example. The common electrode 235 is made of, for example, indium tin oxide (ITO).

The counter substrate 236 is, for example, a transparent substrate having optical transparency, such as quartz, glass, and silicon. The counter substrate 236 is located in the +z direction of the common electrode 235. The counter substrate 236 protects the common electrode 235 and the like from the outside. The polarization plate 237 is made of, for example, polyvinyl alcohol (PVA) in which iodine compound molecules are adsorbed and aligned.

"Electrode Structure"

Figure 4:
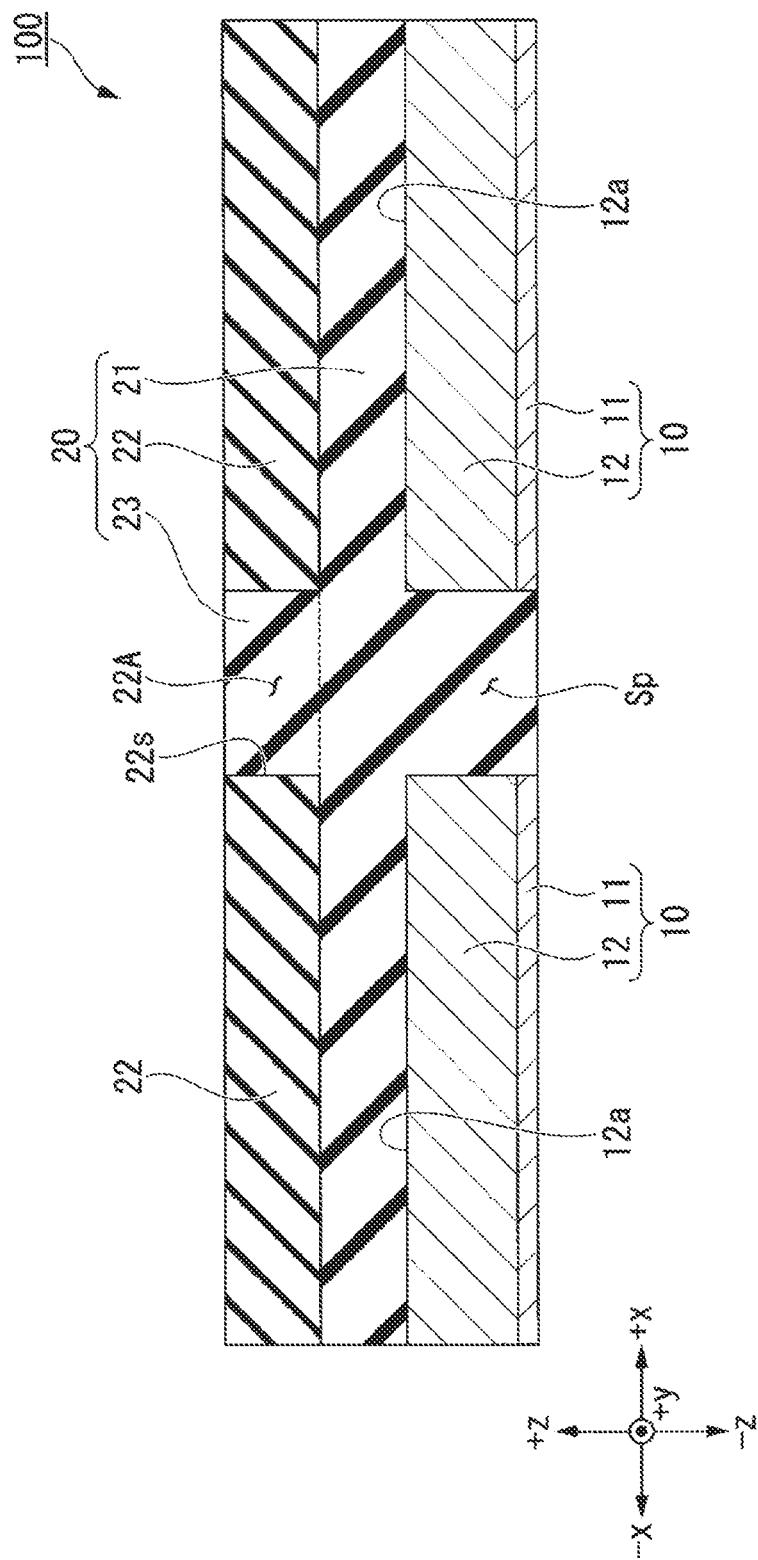
FIG. 4 is a cross-sectional view of an electrode structure according to the first embodiment.

FIG. 4 is a cross-sectional view of the electrode structure 100 according to the first embodiment. FIG. 4 is an enlarged cross-sectional view of the vicinity of the electrode structure 100 in FIG. 3. The electrode structure 100 includes a plurality of pixel electrodes 10 and a plurality of dielectric layers 20.

The plurality of pixel electrodes 10 is provided in each of the pixels Px. The plurality of pixel electrodes 10 is located in the pixel region Rp. The plurality of pixel electrodes 10 is separated from each other. The space Sp is formed between adjacent pixel electrodes 10. The space Sp extends in the x direction and the y direction along each side of the pixel electrode 10 when viewed from the z direction. The plurality of pixel electrodes 10 is arranged in the x direction and the y direction with the space Sp sandwiched therebetween. The plurality of pixel electrodes 10 includes a plurality of electrode rows Er in the y direction. In the electrode rows Er, the pixel electrodes 10 are arranged in the x direction with the space Sp sandwiched therebetween.

In each electrode row Er in FIG. 2, the positions of the pixel electrodes 10 and the space Sp in the x direction coincide with each other. That is, a pixel electrode 10 of the adjacent electrode row Er is located at the position in the y direction of one pixel electrode 10, and space Sp of the adjacent electrode row Er is located at the position in the y direction of one piece of space Sp. The pixel electrode 10 in FIG. 2 has a substantially rectangular shape in plan view, and the length of one side is, for example, several μm. The width of the space Sp is, for example, several hundred nm. The narrower width of the space Sp is more preferable, but makes processing more difficult.

The pixel electrode 10 includes, for example, a first conductive film 11 and a second conductive film 12. The first conductive film 11 is made of, for example, Ti or TiN. The first conductive film 11 is located between the plug wire 222 and the second conductive film 12. The first conductive film 11 enhances the crystallinity of the second conductive film 12. The first conductive film 11 may be referred to as a barrier metal. The first conductive film 11 preferably has a thickness of 20 nm or more. The sufficient thickness of the first conductive film 11 improves the crystallinity of the second conductive film 12. In contrast, good crystallinity of the first conductive film 11 improves the crystallinity of the second conductive film 12 even when the first conductive film 11 has a thickness of less than 20 nm. The crystallinity of the first conductive film 11 can be enhanced by forming the first conductive film 11 by a method of forming a film, such as an ion metal plasma method and a long throw method.

The second conductive film 12 is made of, for example, Al metal or Al alloy, and is made of, in a specific example, AlCu alloy. The crystallinity of the second conductive film 12 increased by the first conductive film 11 enhances the flatness of a first surface 12a of the second conductive film 12, which improves reflectance. The second conductive film 12 has a thickness of, for example, 70 nm or more. The ends of the first conductive film 11 and the second conductive film 12 in the x direction and the y direction may be inclined with respect to the z direction.

The plurality of dielectric layers 20 includes, for example, a first dielectric layer 21, a second dielectric layer 22, and a third dielectric layer 23. The first dielectric layer 21 spreads over the plurality of pixel electrodes 10 in the xy plane, and also exists in the space Sp between the pixel electrodes 10. The first dielectric layer 21 has a refractive index of visible light of, for example, 1.45 or less, and is made of, for example, silicon oxide ($SiO_2$) or aluminum oxide ($Al_2O_3$).

The second dielectric layer 22 sandwiches the first dielectric layer 21 together with the plurality of pixel electrodes 10. The second dielectric layer 22 has a slit 22A at a position overlapping the space Sp between the plurality of pixel electrodes 10 when viewed from the z direction. The slit 22A extends in the x direction and the y direction along each side of the pixel electrode 10 when viewed from the z direction. The second dielectric layer 22 includes, for example, a plurality of dielectric layers divided by the slit 22A. The slit 22A has a width of, for example, several hundred nm. The width of the slit 22A may be changed depending on, for example, the wavelength of incident light. In the plurality of liquid crystal display devices 200R, 200G, and 200B in FIG. 1, the widths of the slits 22A in the liquid crystal display devices 200R, 200G, and 200B may be different from each other. A side surface of the second dielectric layer 22 on which the slit 22A is formed may be inclined with respect to the z direction.

The second dielectric layer 22 includes dielectric material having a refractive index higher than that of the first dielectric layer 21. The second dielectric layer 22 can include dielectric material having a refractive index higher than that of the first dielectric layer 21. The difference in refractive index between the second dielectric layer 22 and the first dielectric layer 21 is preferably, for example, 0.45 or more. The second dielectric layer 22 has a refractive index of visible light of, for example, larger than 1.45, and is made of, for example, silicon nitride (SiN), tantalum pentoxide ($Ta_2O_5$), hafnium oxide ($HfO_2$), niobium oxide (NbO, $NbO_2$, $Nb_2O_3$, and $Nb_2O_5$), or titanium oxide ($TiO_2$). In addition to reflection at the pixel electrode 10, reflection at the interface between the second dielectric layer 22 and the first dielectric layer 21 improves the reflectance of the electrode structure 100.

The third dielectric layer 23 is in contact with a side surface 22s of the second dielectric layer 22 facing the slit 22A. The third dielectric layer 23 fills at least a part of the slit 22A. The third dielectric layer 23 fills the slit 22A, for example. The third dielectric layer 23 includes dielectric material having a refractive index lower than that of the second dielectric layer 22. The third dielectric layer 23 can include dielectric material having a refractive index lower than that of the second dielectric layer 22. The third dielectric layer 23 has a refractive index of visible light of, for example, 1.45 or less, and is made of, for example, silicon oxide ($SiO_2$) or aluminum oxide ($Al_2O_3$). The third dielectric layer 23 includes, for example, material similar to that of the first dielectric layer 21. When the third dielectric layer 23 and the first dielectric layer 21 have the same material, it is difficult to see a clear interface between the first dielectric layer 21 and the third dielectric layer.

The thicknesses of the first dielectric layer 21, the second dielectric layer 22, and the third dielectric layer 23 are designed in accordance with the wavelength of incident light. In the plurality of liquid crystal display devices 200R, 200G, and 200B in FIG. 1, the thicknesses of the first dielectric layer 21, the second dielectric layer 22, and the third dielectric layer 23 in the liquid crystal display devices 200R, 200G, and 200B may be different from each other.

"Method of Manufacturing Electrode Structure"

Next, a method of manufacturing the electrode structure 100 in the projective display device 300 will be described. Each portion of the liquid crystal display device 200 other than the electrode structure 100 and the like can be manufactured by a known manufacturing method.

First, a first method of manufacturing the electrode structure 100 will be described with reference to FIGS. 5 to 7. The first manufacturing method includes the steps of: sequentially forming a conductive layer, a first dielectric layer, and a second dielectric layer including dielectric material having a refractive index higher than that of the first dielectric layer; forming a through hole that penetrates at least the second dielectric layer among the conductive layer, the first dielectric layer, and the second dielectric layer; and filling the through hole with a third dielectric layer.

Figure 5:
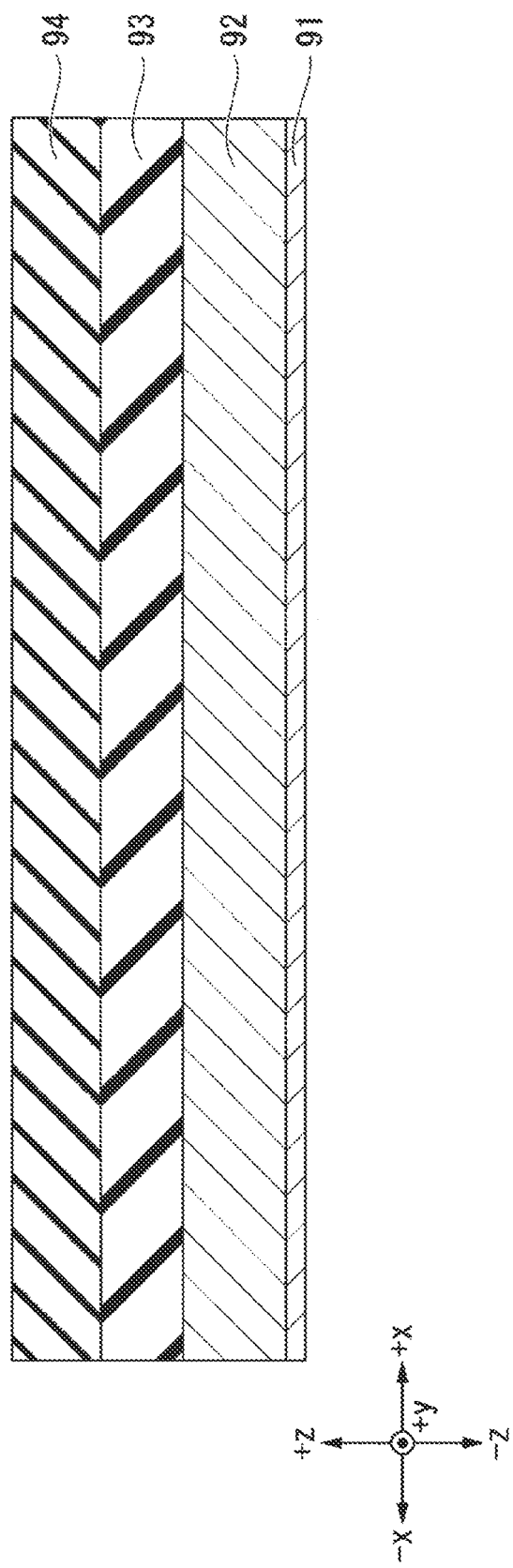
FIG. 5 is a cross-sectional view for illustrating a first method of manufacturing the electrode structure according to the first embodiment.

In the first manufacturing method, first, as illustrated in FIG. 5, a conductive layer 91, a conductive layer 92, a dielectric layer 93, and a dielectric layer 94 are sequentially formed. The dielectric layer 93 is one example of the first dielectric layer, and the dielectric layer 94 is one example of the second dielectric layer. Each layer is laminated by, for example, a sputtering method. The conductive layer 91 becomes the first conductive film 11 of the pixel electrode 10. The conductive layer 92 becomes the second conductive film 12 of the pixel electrode 10. The dielectric layer 93 becomes a part of the first dielectric layer 21. The dielectric layer 94 becomes the second dielectric layer 22. Material and a film thickness of each of the conductive layer 91, the conductive layer 92, the dielectric layer 93, and the dielectric layer 94 are appropriately selected in accordance with the above-described configuration after manufacturing.

Next, a resist 95 having a predetermined pattern is formed on a part of the dielectric layer 94. Antireflective coating (BARC) may be formed between the resist 95 and the dielectric layer 94. Next, the conductive layer 91, the conductive layer 92, the dielectric layer 93, and the dielectric layer 94 are processed by using the resist 95 as a mask to form a hole H through the conductive layer 91, the conductive layer 92, the dielectric layer 93, and the dielectric layer 94. A resist is used as a mask for processing, and patterning is formed by a method such as photolithography. In this case, a light shielding mask used in a lithography process is, for example, a binary mask or a halftone mask. After a resist pattern is transferred onto a workpiece, a dielectric layer and a conductive layer, which are workpieces, are processed by using an anisotropic dry etching method. As illustrated in FIG. 6, the conductive layers 91 and 92 become the pixel electrodes 10 by this processing, and the dielectric layer 94 becomes the second dielectric layer 22 by the processing. A part of the hole H is space Sp between the pixel electrodes 10, and is the slit 22A of the second dielectric layer 22. An antireflective coating (BARC) and a halftone mask can narrow the space Sp between the pixel electrodes 10.

Figure 7:
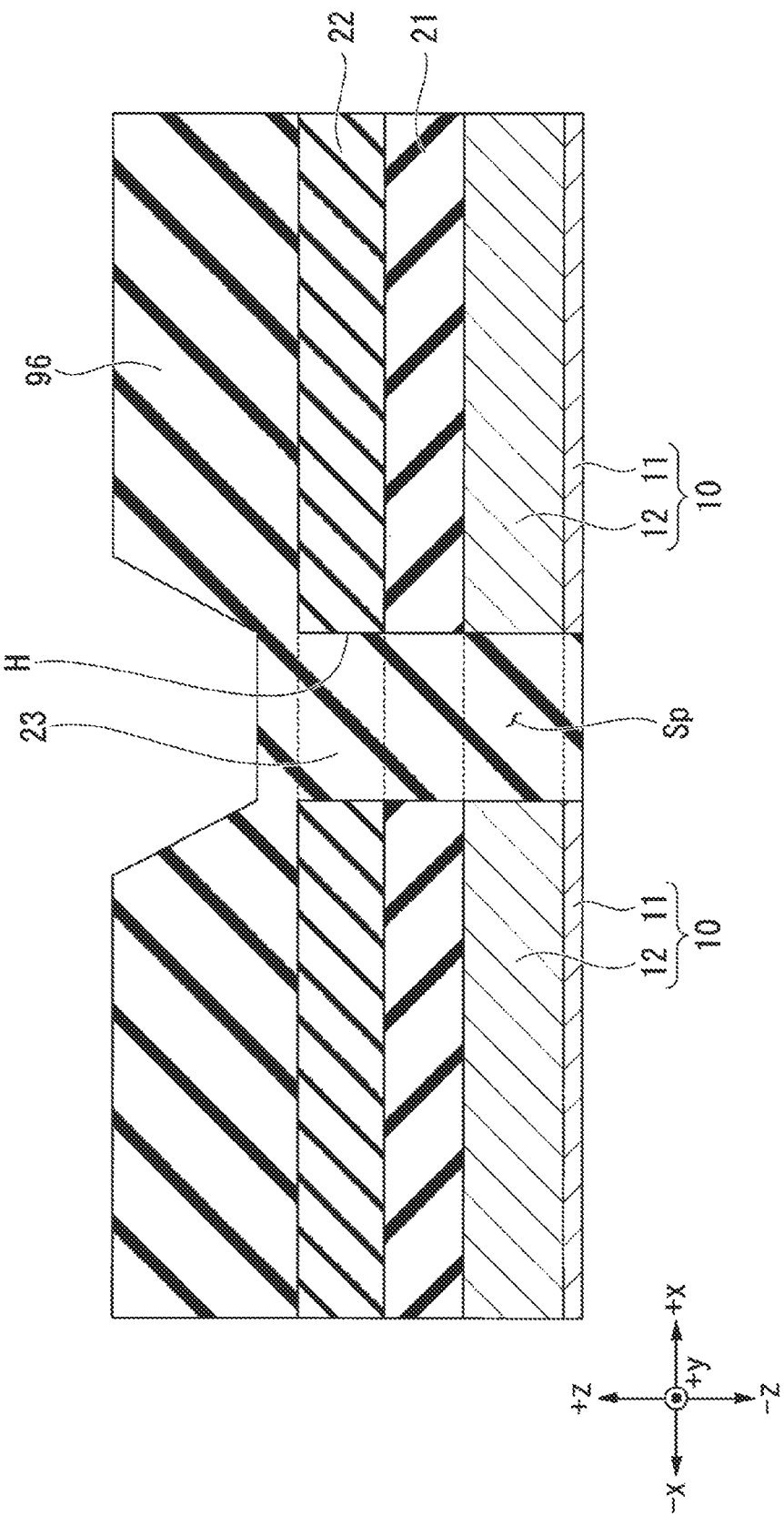
FIG. 7 is a cross-sectional view for illustrating the first method of manufacturing the electrode structure according to the first embodiment.

Next, as illustrated in FIG. 7, a dielectric layer 96 is formed to fill the hole H. The dielectric layer 96 is formed by using, for example, high-density plasma (HDP). The dielectric layer 96 includes dielectric layer material having a refractive index lower than that of the second dielectric layer 22. A part of the dielectric layer 96 constitutes a part of the first dielectric layer 21 and the third dielectric layer 23. In the first manufacturing method, the first dielectric layer 21 and the third dielectric layer 23 are simultaneously formed and integrated.

Finally, a portion of the dielectric layer 96 located in the +z direction from the second dielectric layer 22 is removed. The dielectric layer 96 is removed by, for example, chemical mechanical polishing (CMP). For example, when the second dielectric layer 22 is made of SiN and the dielectric layer 96 is made of $SiO_2$, the processing selection ratio of $SiO_2$ is set to be higher than the processing selection ratio of SiN as a condition for performing the CMP. For example, silica slurry or ceria slurry is used as slurry. Processing under such a condition causes the second dielectric layer 22 to function as a stopper film in the CMP. One surface of the third dielectric layer 23 in the +z direction may be recessed from one surface of the second dielectric layer 22 in the +z direction. The electrode structure 100 is obtained by removing a part of the dielectric layer 96.

Figure 8:
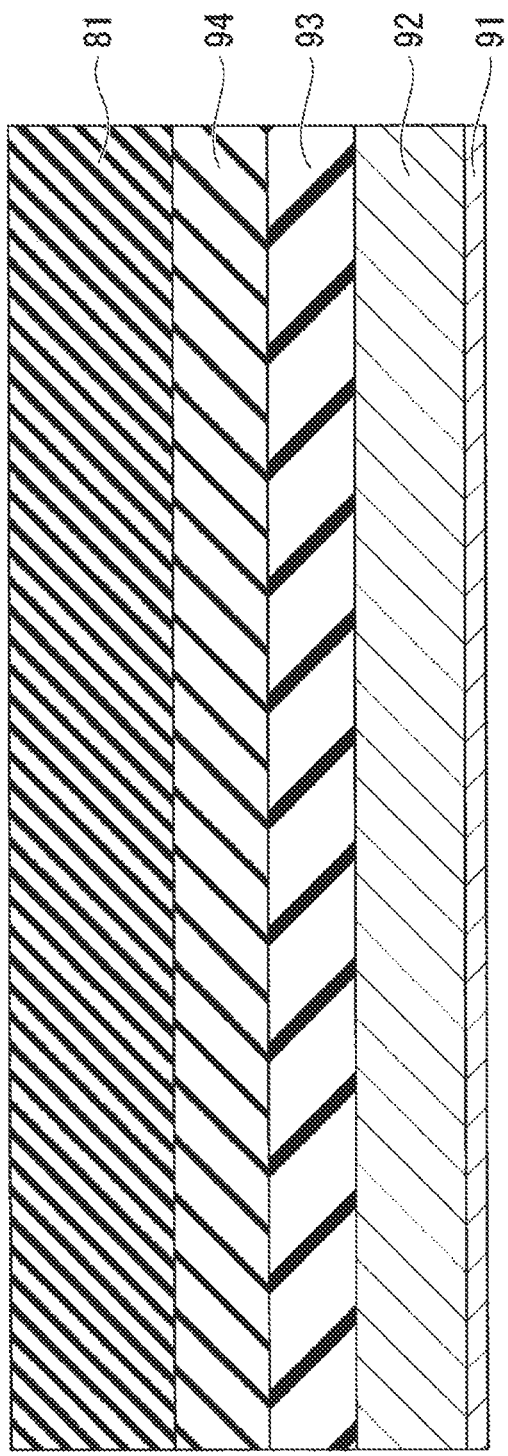
FIG. 8 is a cross-sectional view for illustrating a second method of manufacturing the electrode structure according to the first embodiment.
Figure 9:
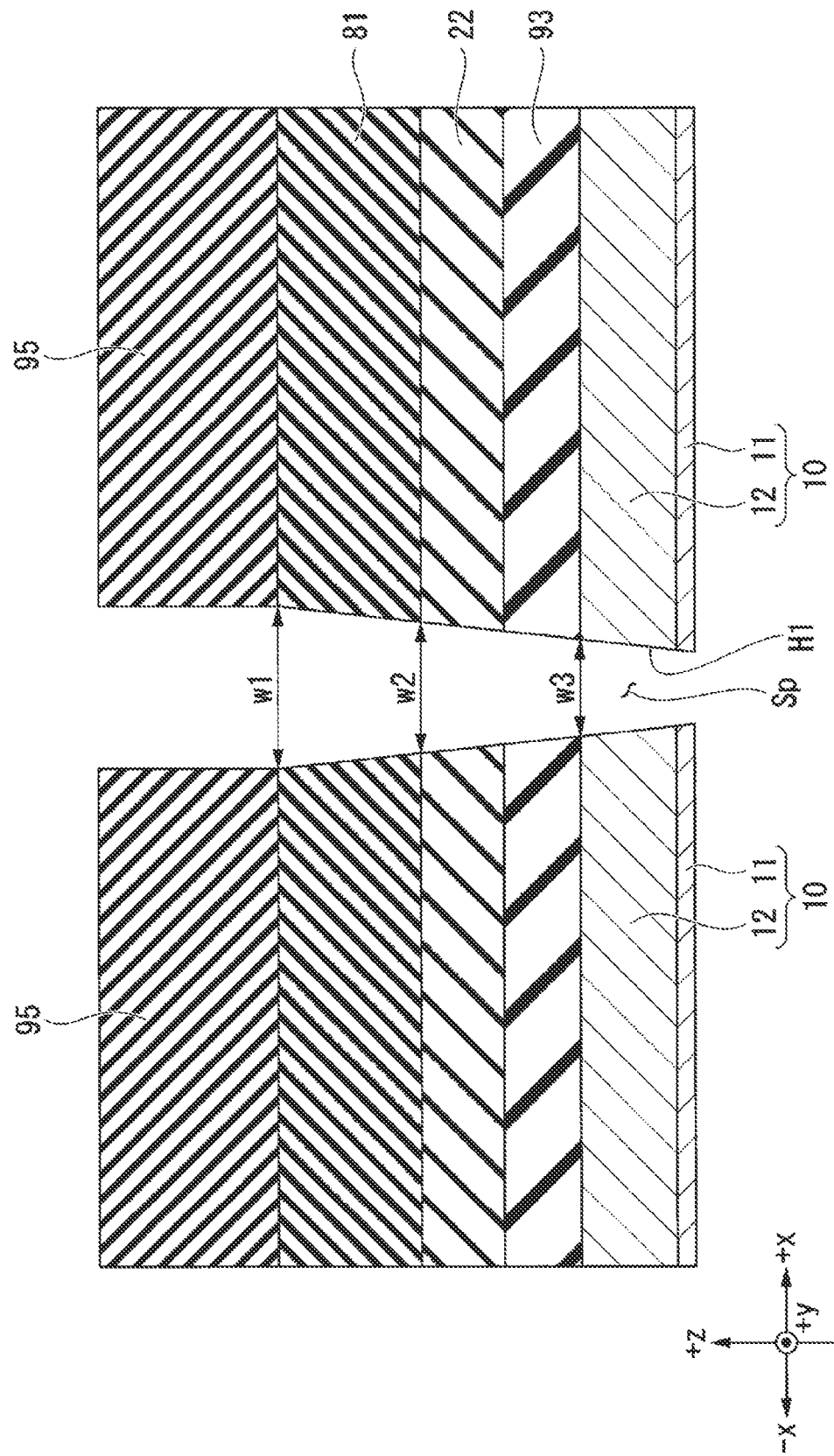
FIG. 9 is a cross-sectional view for illustrating the second method of manufacturing the electrode structure according to the first embodiment.

Next, a second manufacturing method will be described. The second manufacturing method is different in that a sacrificial layer 81 is further formed on a surface of the dielectric layer 94 opposite to the dielectric layer 93 in the film forming process in the first manufacturing method. First, as illustrated in FIG. 8, the conductive layer 91, the conductive layer 92, the dielectric layer 93, the dielectric layer 94, and the sacrificial layer 81 are sequentially formed. The sacrificial film 81 is removed in the manufacturing process. The sacrificial layer 81 includes, for example, the same material as the third dielectric layer 23. The sacrificial layer 81 is made of, for example, silicon oxide. The sacrificial layer 81 can be removed by, for example, etching.

Next, a resist 95 having a predetermined pattern is formed on a part of the dielectric layer 94. Next, as in the first manufacturing method, a hole H1 is formed by using the resist 95 as a mask. The hole H1 passes through the conductive layer 91, the conductive layer 92, the dielectric layer 93, the dielectric layer 94, and the sacrificial layer 81. The conductive layers 91 and 92 become the pixel electrodes 10 by this processing, and the dielectric layer 94 becomes the second dielectric layer 22 by the processing. For example, the hole H1 has a diameter that decreases toward the pixel electrode 10. For example, a width w1 of the hole H1 at a surface position of the sacrificial layer 81 in the +z direction is wider than a width w2 of the hole H1 at a surface position of the second dielectric layer 22 in the +z direction. The width w2 of the hole H1 at a surface position of the second dielectric layer 22 in the +z direction is wider than a width w3 of the hole H1 at a surface position of the pixel electrode 10 in the +z direction. The width w3 of the hole H1 at a surface position of the pixel electrode 10 in the +z direction is the maximum width of the space Sp between the pixel electrodes 10. The space Sp between the pixel electrodes 10 is narrowed by forming the hole H1 after the sacrificial layer 81 is laminated.

Finally, the sacrificial layer 81 and the resist 95 are removed, and the space Sp is filled with the third dielectric layer 23 to form the electrode structure 100.

Next, a third manufacturing method will be described. The third manufacturing method includes the steps of: sequentially forming a conductive layer and a first dielectric layer; forming a through hole in the conductive layer and the first dielectric layer, and forming pixel electrodes; filling space between the pixel electrodes with dielectric; laminating a second dielectric layer including dielectric material having a refractive index higher than that of the first dielectric layer over the first dielectric layer; forming an opening in the second dielectric layer; and filling the opening with a third dielectric layer.

Figure 10:
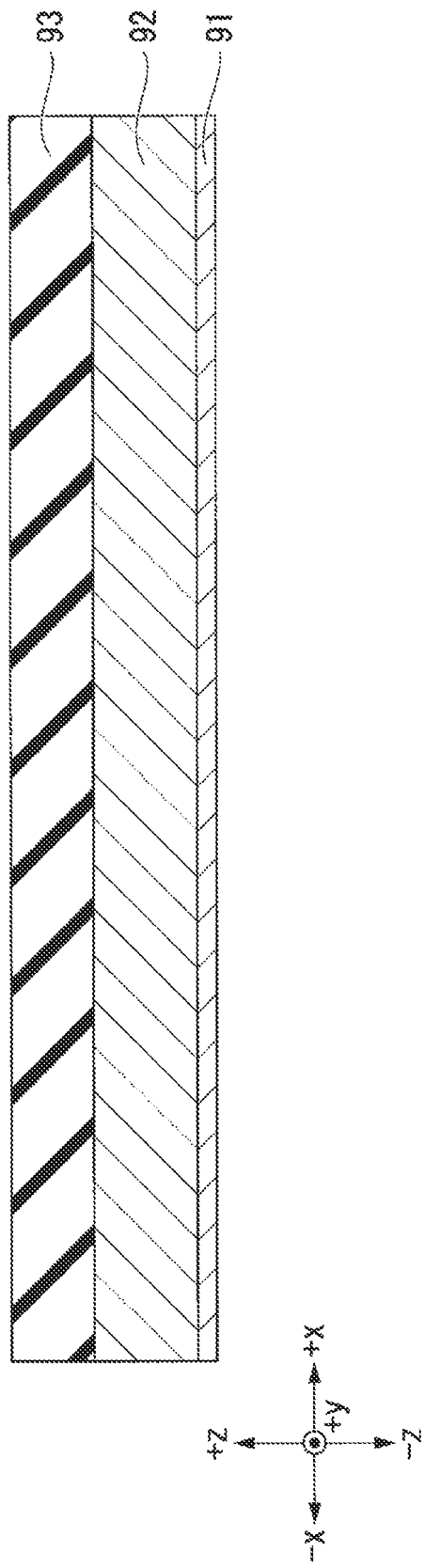
FIG. 10 is a cross-sectional view for illustrating a third method of manufacturing the electrode structure according to the first embodiment.

First, as illustrated in FIG. 10, the conductive layer 91, the conductive layer 92, and the dielectric layer 93 are sequentially formed. The third manufacturing method is different from the first manufacturing method in FIG. 5 in that the dielectric layer 94 is not laminated.

Next, the resist 95 having a predetermined pattern is formed on a part of the dielectric layer 93. Next, as in the first manufacturing method, a hole H2 is formed by using the resist 95 as a mask. The hole H2 passes through the conductive layer 91, the conductive layer 92, and the dielectric layer 93. The conductive layers 91 and 92 become the pixel electrodes 10 by this processing.

Figure 12:
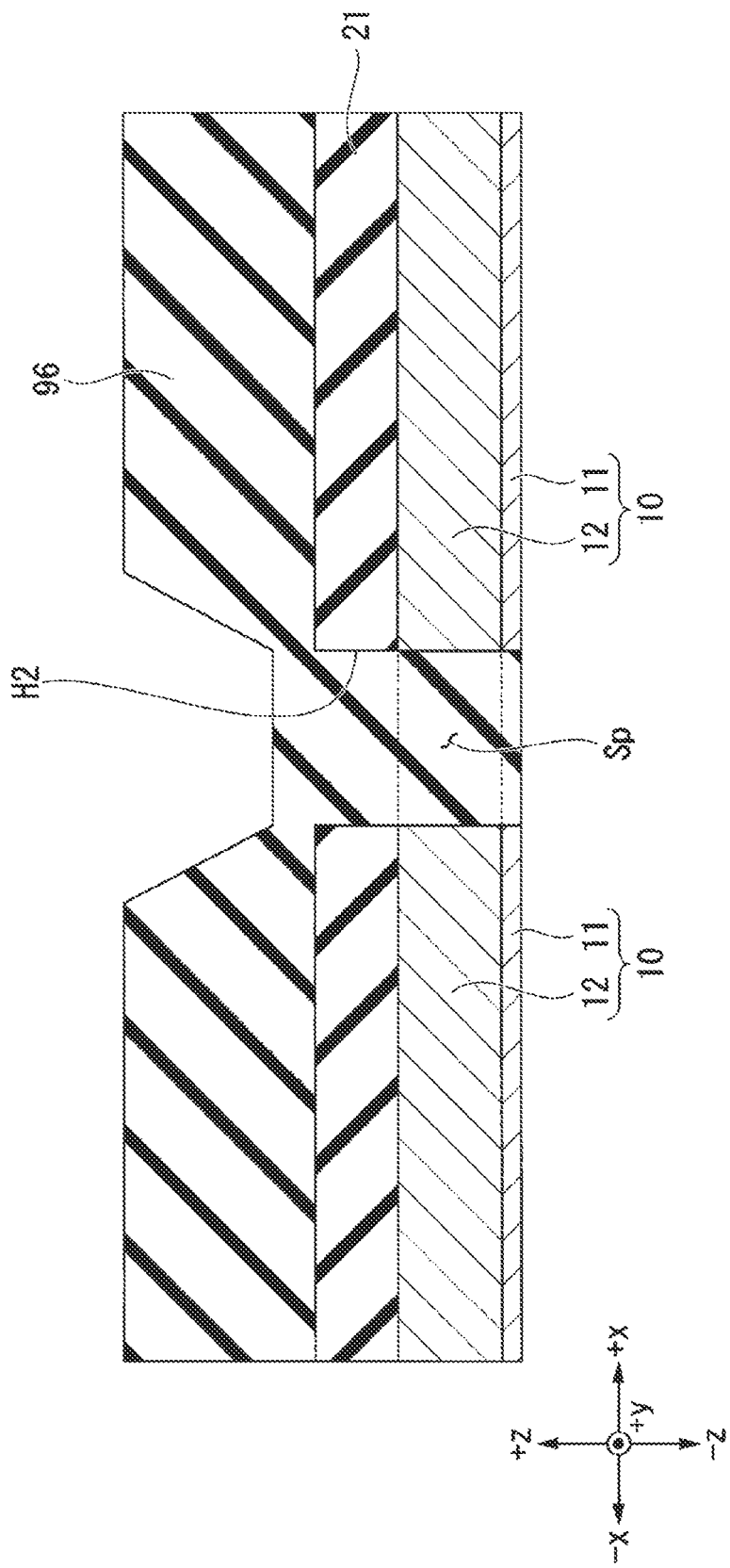
FIG. 12 is a cross-sectional view for illustrating the third method of manufacturing the electrode structure according to the first embodiment.

Next, as illustrated in FIG. 12, a dielectric layer 96 is formed to fill the hole H2. A part of the dielectric layer 96 becomes a part of the first dielectric layer 21. Then, a portion of the dielectric layer 96 located in the +z direction from the first dielectric layer 21 is removed. The dielectric layer 96 is removed by, for example, chemical mechanical polishing (CMP). First, the pixel electrode 10 and the first dielectric layer 21 of the electrode structure 100 are formed by CMP polishing.

Figure 13:
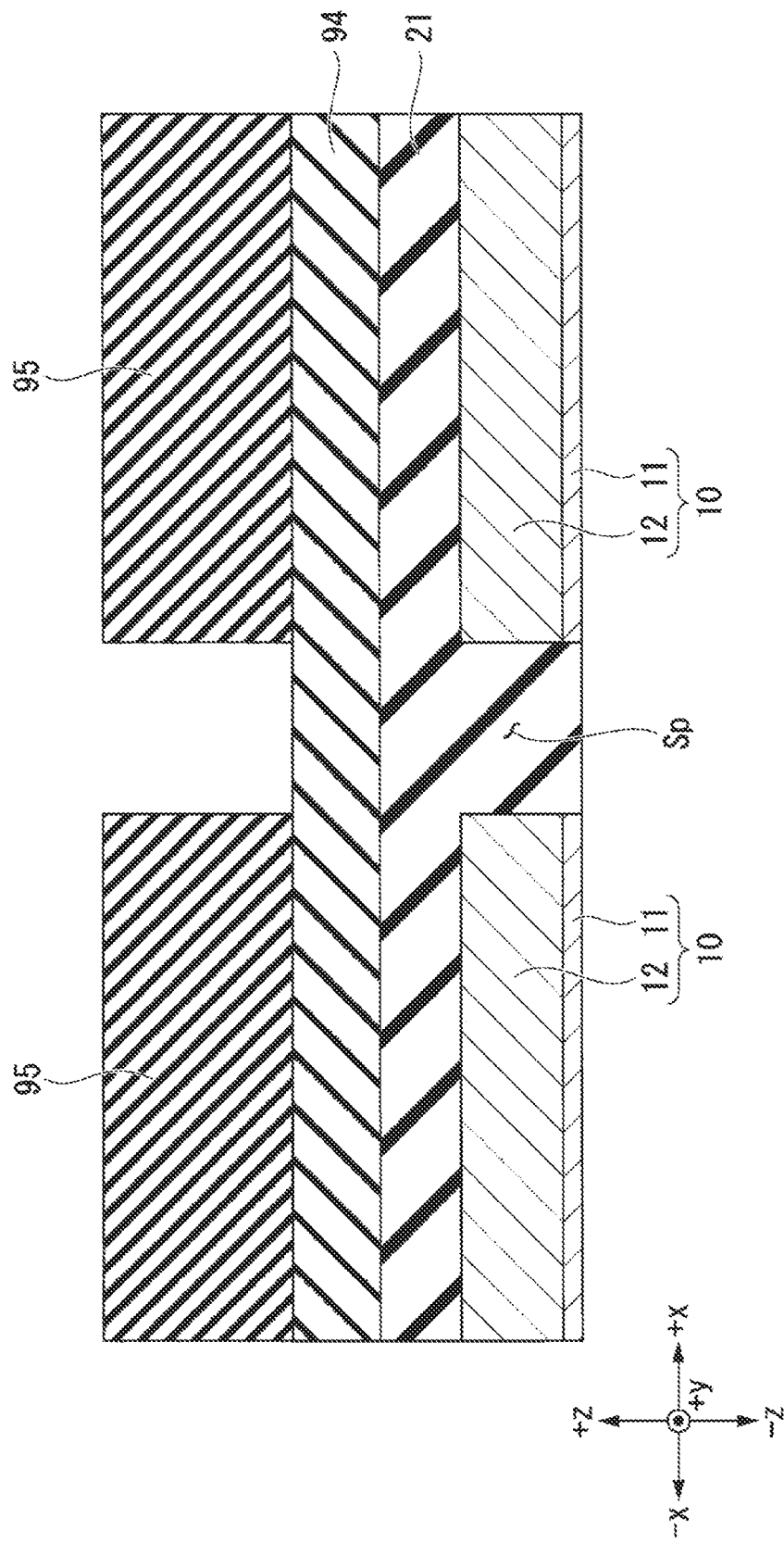
FIG. 13 is a cross-sectional view for illustrating the third method of manufacturing the electrode structure according to the first embodiment.
Figure 14:
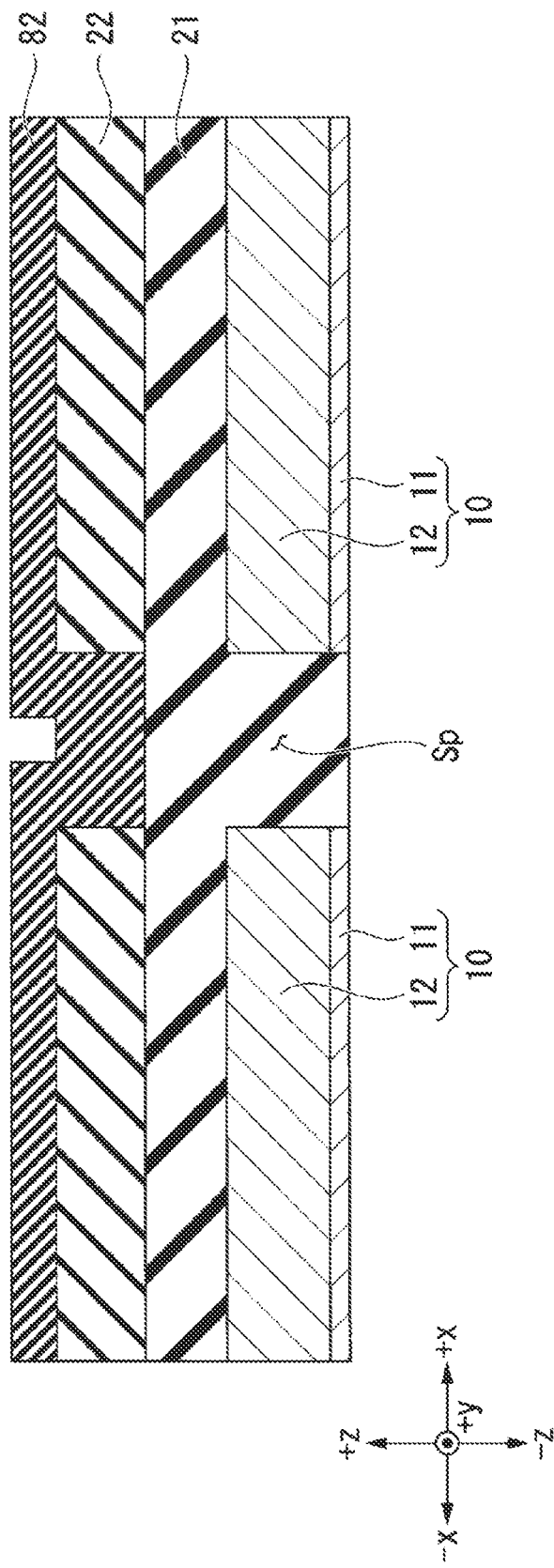
FIG. 14 is a cross-sectional view for illustrating the third method of manufacturing the electrode structure according to the first embodiment.

Next, as illustrated in FIG. 13, the dielectric layer 94 is laminated on one surface of the first dielectric layer 21, and the resist 95 having a predetermined pattern is formed on a part of the dielectric layer 94. The dielectric layer 94 is processed by using the resist 95 as a mask. The dielectric layer 94 becomes the second dielectric layer 22 by the processing.

Finally, a dielectric layer 82 is laminated over the second dielectric layer 22. The dielectric layer 82 includes dielectric layer material having a refractive index lower than that of the second dielectric layer 22. The dielectric layer 82 includes, for example, material similar to that of the third dielectric layer 23. Then, a portion of the dielectric layer 82 located in the +z direction from the second dielectric layer 22 is removed. The electrode structure 100 is formed by removing a part of the dielectric layer 82. The dielectric layer 82 is removed by, for example, chemical mechanical polishing (CMP). Note that an electrode structure 100A to be described later is formed when the dielectric layer 82 is used as the third dielectric layer 23 without removing a part of the dielectric layer 82.

Next, a fourth manufacturing method will be described. The fourth manufacturing method includes the steps of: laminating a conductive layer and a sacrificial layer; forming a through hole in the conductive layer and the sacrificial layer and filling the through hole with dielectric; removing the sacrificial layer and laminating a first dielectric layer and a second dielectric layer; forming an opening in the second dielectric layer; and filling the opening with a third dielectric layer.

Figure 15:
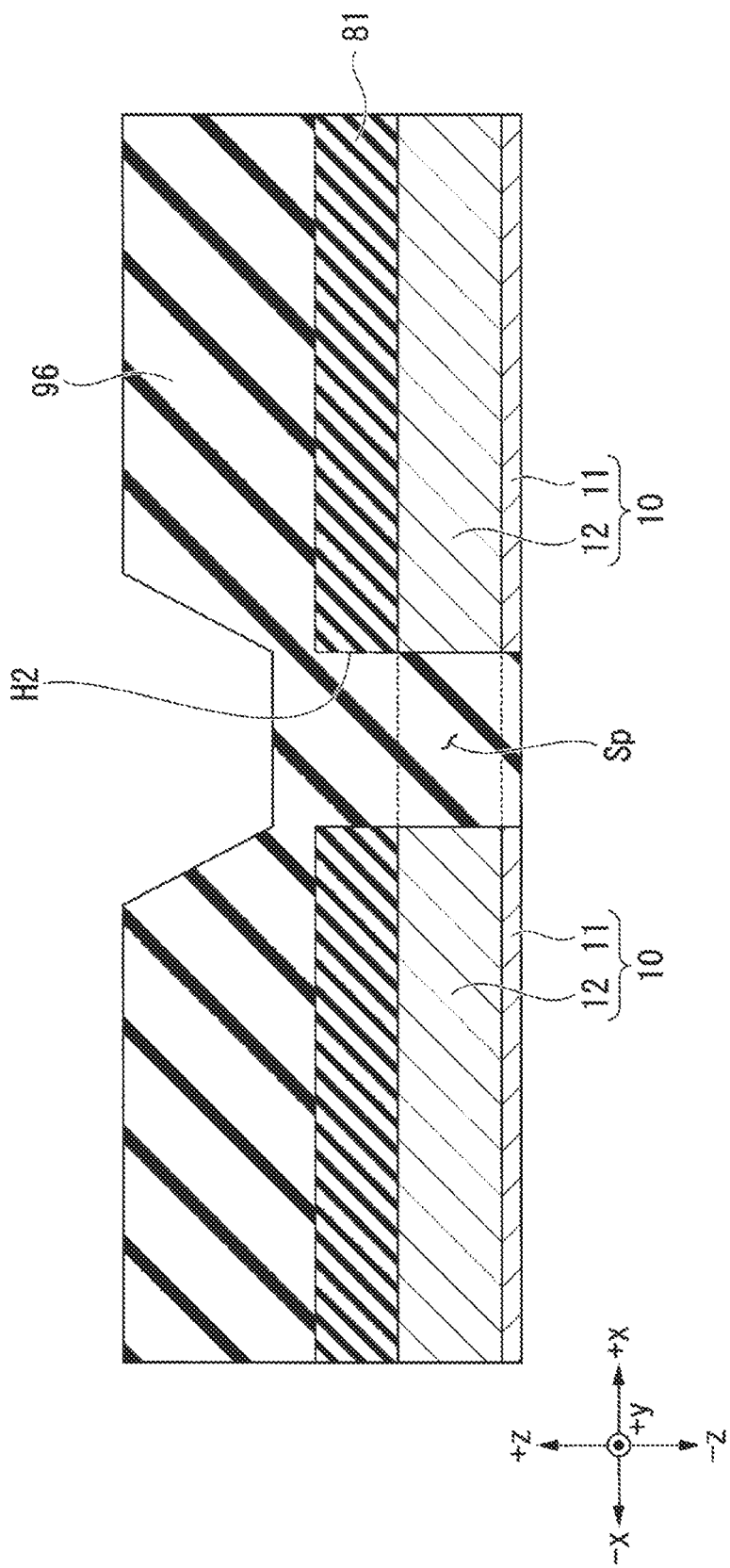
FIG. 15 is a cross-sectional view for illustrating a fourth method of manufacturing the electrode structure according to the first embodiment.

FIG. 15 illustrates the middle of the fourth manufacturing method. The fourth manufacturing method is the same as the processes in FIGS. 10 to 12 of the third manufacturing method except that the sacrificial layer 81 is used instead of the dielectric layer 93.

Figure 16:
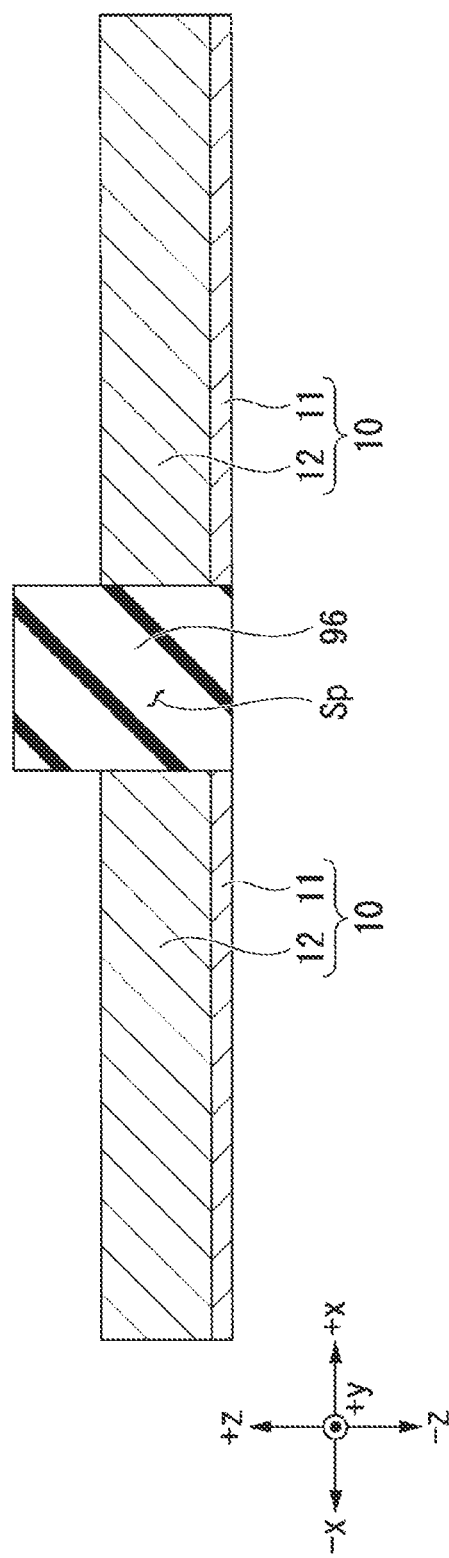
FIG. 16 is a cross-sectional view for illustrating the fourth method of manufacturing the electrode structure according to the first embodiment.

Next, a portion of the dielectric layer 96 located in the +z direction from the sacrificial layer 81 is removed. The dielectric layer 96 is removed by, for example, chemical mechanical polishing (CMP). Thereafter, as illustrated in FIG. 16, the pixel electrode 10 is exposed by removing the sacrificial layer 81.

Figure 17:
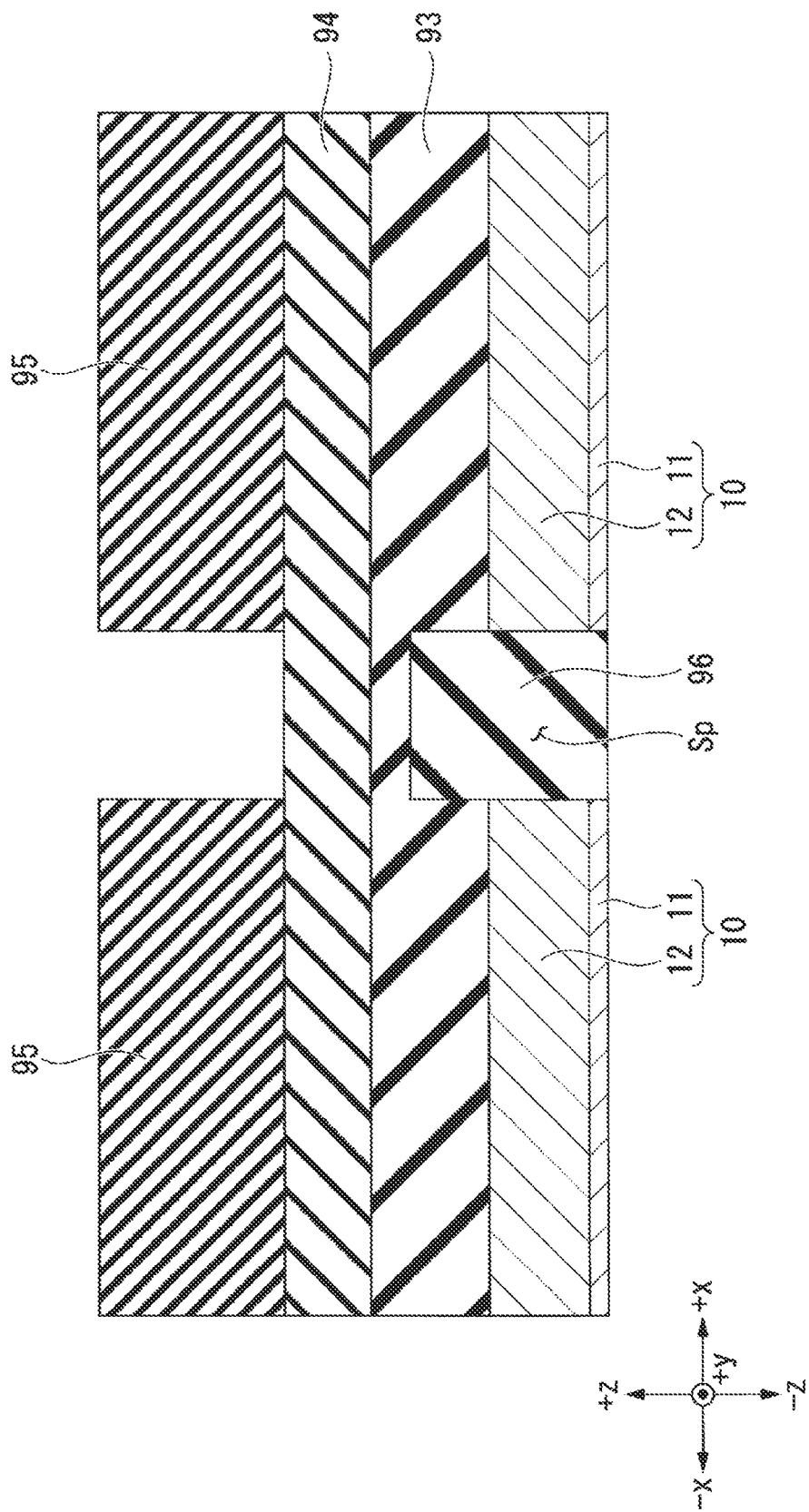
FIG. 17 is a cross-sectional view for illustrating the fourth method of manufacturing the electrode structure according to the first embodiment.

Next, as illustrated in FIG. 17, the dielectric layer 93 and the dielectric layer 94 are sequentially laminated over the remaining dielectric layer 96 and the pixel electrode 10. The dielectric layer 93 and the dielectric layer 96 constitute the first dielectric layer 21. The resist 95 having a predetermined pattern is formed on a part of the dielectric layer 94. The dielectric layer 94 becomes the second dielectric layer 22 by forming an opening in the dielectric layer 94 via the resist 95. The electrode structure 100 is formed by filling the opening with the third dielectric layer 23.

Next, a fifth manufacturing method will be described. The fifth manufacturing method includes the steps of: forming a through hole in a conductive layer and forming pixel electrodes; filling space between the pixel electrodes with dielectric; laminating a first dielectric layer and a second dielectric layer including dielectric material having a refractive index higher than that of the first dielectric layer over the pixel electrodes; forming an opening in the second dielectric layer; and filling the opening with a third dielectric layer.

Figure 11:
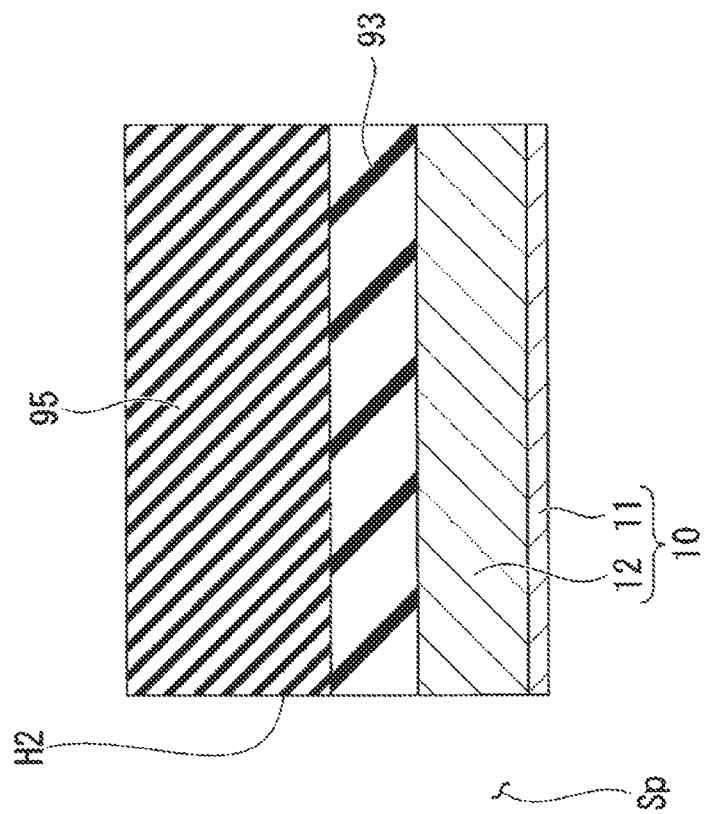
FIG. 11 is a cross-sectional view for illustrating the third method of manufacturing the electrode structure according to the first embodiment.

The fifth manufacturing method is the same as the third manufacturing method in the processes in FIGS. 10 to 12. Although, in the third manufacturing method, a portion of the dielectric layer 96 located in the +z direction from the first dielectric layer 21 is removed, the dielectric layer 96 and the first dielectric layer 21 are removed to expose the pixel electrode 10 in the fifth manufacturing method.

The process after exposing the pixel electrode 10 is the same as that in the fourth manufacturing method. As illustrated in FIG. 17, the dielectric layer 93 and the dielectric layer 94 are sequentially laminated over the remaining dielectric layer 96 and the pixel electrode 10. The dielectric layer 93 and the dielectric layer 96 constitute the first dielectric layer 21. The resist 95 having a predetermined pattern is formed on a part of the dielectric layer 94. The dielectric layer 94 becomes the second dielectric layer 22 by forming an opening in the dielectric layer 94 via the resist 95. The electrode structure 100 is formed by filling the opening with the third dielectric layer 23.

Next, a sixth method of manufacturing the electrode structure 100 will be described with reference to FIGS. 18 to 20. The sixth manufacturing method includes the steps of: forming an insulating layer and forming a recess in the insulating layer; filling the recess with a conductor; sequentially laminating a first dielectric layer and a second dielectric layer on the insulating layer and the conductor; forming a slit in the second dielectric layer; and filling the slit with a third dielectric layer.

Figure 18:
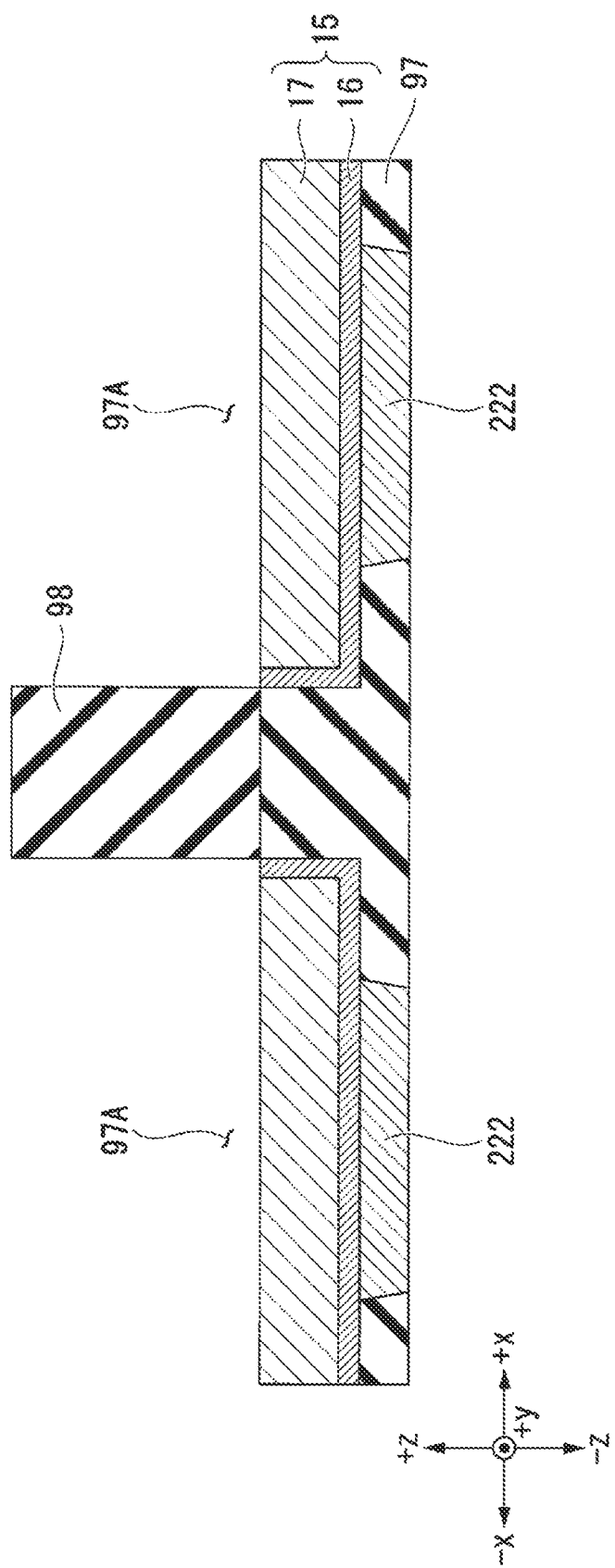
FIG. 18 is a cross-sectional view for illustrating a sixth method of manufacturing the electrode structure according to the first embodiment.
Figure 19:
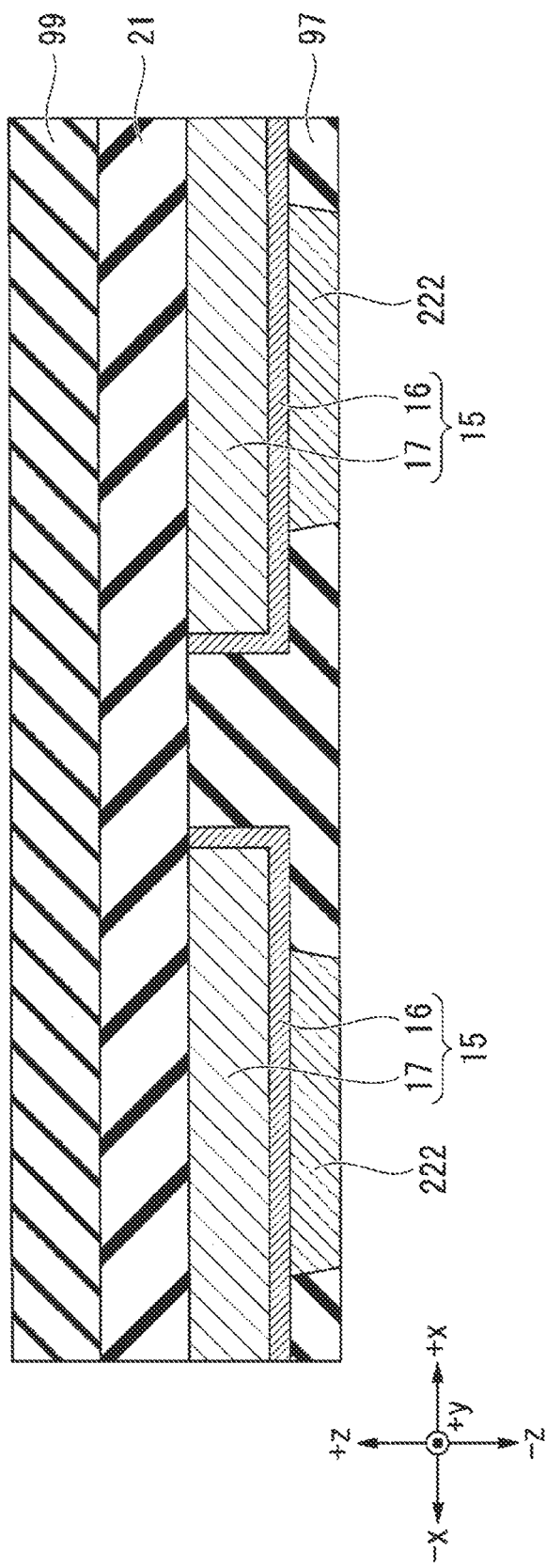
FIG. 19 is a cross-sectional view for illustrating the sixth method of manufacturing the electrode structure according to the first embodiment.

First, as illustrated in FIG. 18, an insulating layer 97 with the plug wire 222 is formed, and a recess 97A is formed in a part of the insulating layer 97. The part of the insulating layer 97 becomes a part of the insulating layer 223 of the pixel circuit 220 (see FIG. 3). The recess 97A is formed by forming a resist 98 having a predetermined pattern on a part of the insulating layer 97 and processing the resist 98 as a mask. The recess 97A is formed by, for example, photolithography or the like.

Next, the resist 98 is peeled off. Then, two conductive layers are laminated on surfaces of the insulating layer 97 and the plug wire 222. The conductive layers are formed along the surfaces of the insulating layer 97 and the plug wire 222. Then, the laminated conductive layers are removed until a part of the insulating layer 97 is exposed. The conductive layers are processed by, for example, CMP. The two conductive layers become a first conductive film 16 and a second conductive film 17. The first conductive film 16 and the second conductive film 17 form a pixel electrode 15. The pixel electrode 15 is the same as the pixel electrode 10 in FIG. 4 except for the shapes of the first conductive film 16 and the second conductive film 17. Then, as illustrated in FIG. 19, the first dielectric layer 21 and a dielectric layer 99 are sequentially laminated on parts of the pixel electrode 15 and the insulating layer 97.

Figure 20:
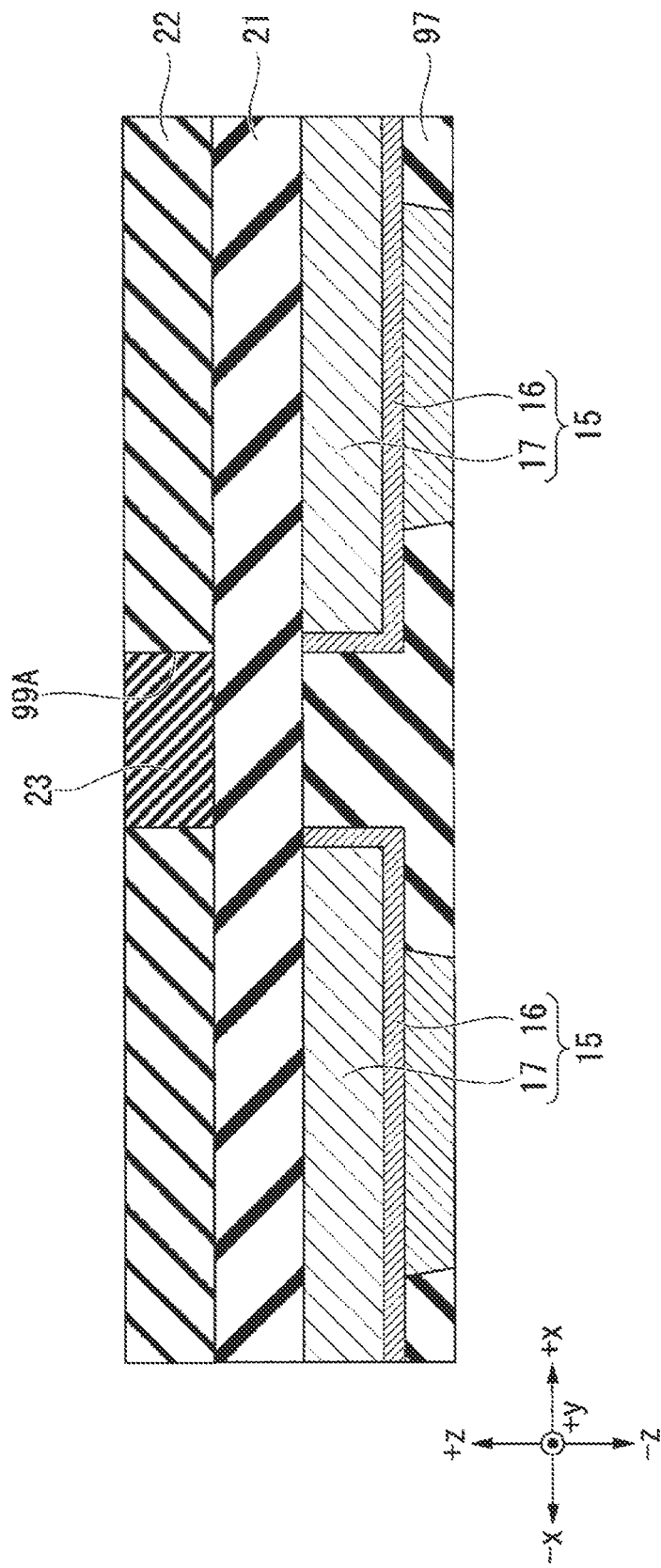
FIG. 20 is a cross-sectional view for illustrating the sixth method of manufacturing the electrode structure according to the first embodiment.

Next, as illustrated in FIG. 20, a slit 99A is provided in a part of the dielectric layer 99, and the slit 99A is filled with the third dielectric layer 23. The slit 99A is formed in the dielectric layer 99, and the second dielectric layer 22 is formed. In the sixth manufacturing method, the first dielectric layer 21 and the third dielectric layer 23 are formed separately.

As described above, according to the first to sixth manufacturing methods, the electrode structure 100 can be manufactured. Note, however, that a method of manufacturing the electrode structure 100 is not limited to the above-described example.

"Effects of Electrode Structure"

Figure 21:
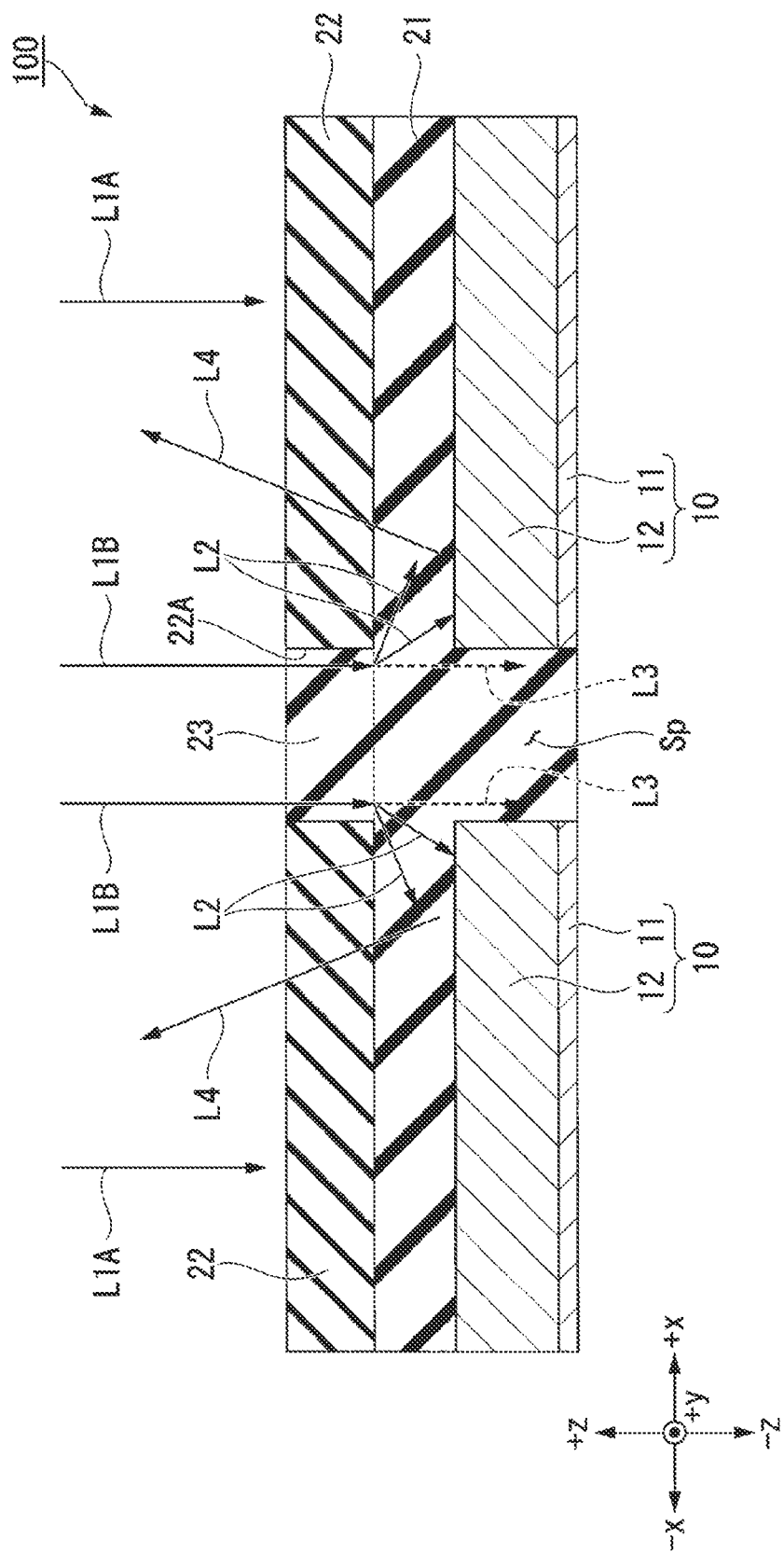
FIG. 21 is a cross-sectional view for illustrating the effects of the electrode structure according to the first embodiment.

FIG. 21 is a cross-sectional view for illustrating the effects of the electrode structure 100 according to the first embodiment. Light L1A and light L1B are incident on the electrode structure 100 from the +z direction to the −z direction.

First, the behavior of the light L1A incident on a position overlapping the pixel electrode 10 in the z direction will be described. The light L1A is reflected by the surface of the second dielectric layer 22, the interface between the first dielectric layer 21 and the second dielectric layer 22, and the surface of the pixel electrode 10. The pixel electrode 10 that hardly transmits light reflects a large amount of light. That is, the utilization efficiency of the light L1A in the electrode structure 100 is high.

Next, the behavior of the light L1B incident on a position not overlapping the pixel electrode 10 in the z direction (position overlapping space Sp) will be described. The electrode structure 100 has the slit 22A in the second dielectric layer 22. The slit 22A is filled with, for example, the third dielectric layer 23. The medium in the slit 22A (third dielectric layer 23) is different from the medium of the second dielectric layer 22. The light L1B is diffracted after passing through the slit 22A. A part of the light L1B is directed toward the pixel electrode 10 as diffracted light L2 by diffraction. A part of the light L1B is diffracted to become the diffracted light L2, so that light L3 directed to the space Sp between the pixel electrodes 10 is inhibited. The diffracted light L2 is reflected by the surface of the pixel electrode 10 to become light L4. In contrast, the light L3 is directed toward the pixel circuit 220 (see FIG. 3) via the space Sp. The light L3 does not return to the side of the liquid crystal layer 233.

When the second dielectric layer 22 does not have the slit 22A, the diffraction phenomenon does not occur. Therefore, most of the light L1B becomes the light L3, and cannot be used. In contrast, since the electrode structure 100 according to the first embodiment has the slit 22A, a part of the light L1B is diffracted as the diffracted light L2, and can be used as the light L4. Therefore, the electrode structure 100 according to the first embodiment can improve the reflectance, and enhance the light utilization efficiency.

A specific example of the first embodiment has been described in detail. The first embodiment is not limited to this example, and various modifications and changes can be made within the scope of the gist of the present invention set forth in the claims.

Figure 22:
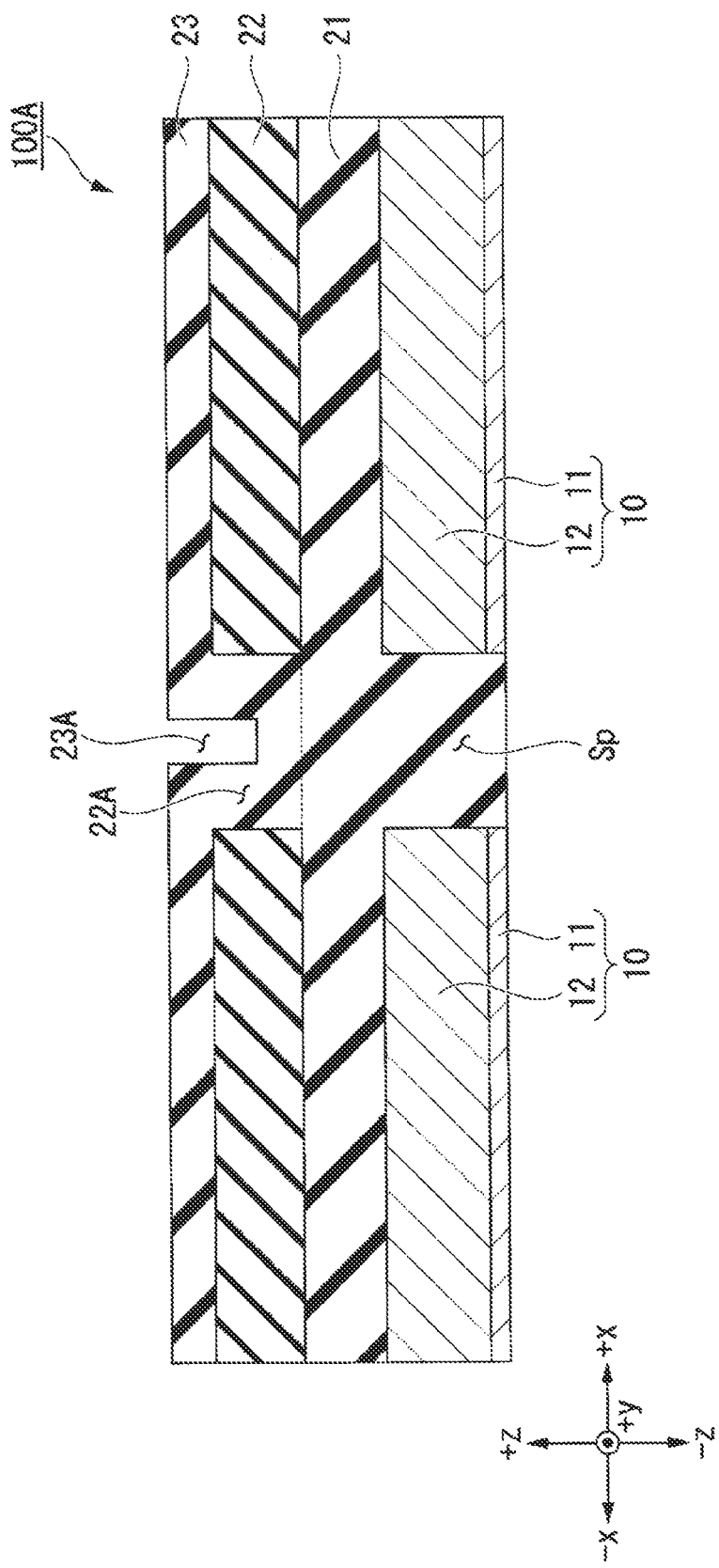
FIG. 22 is a cross-sectional view of an electrode structure according to a first variation.

FIG. 22 is a cross-sectional view of the electrode structure 100A according to a first variation. The electrode structure 100A in FIG. 22 is different from the electrode structure 100 in that the third dielectric layer 23 spreads over the second dielectric layer 22 and partially fills the slit 22A without filling the entire slit. Configurations similar to those of the electrode structure 100 are denoted by similar signs, and descriptions thereof are omitted.

The third dielectric layer 23 is formed along the surface of the second dielectric layer 22. The surface of the third dielectric layer 23 reflects the shape of the surface of the second dielectric layer 22 in which the slit 22A is formed. The third dielectric layer 23 has an opening 23A in a portion overlapping the slit 22A. The third dielectric layer 23 has a refractive index lower than that of the second dielectric layer 22. The third dielectric layer 23 may be, for example, an inorganic alignment film such as an alignment film made of silicon oxide.

The medium in the slit 22A (third dielectric layer 23) is different from the medium of the second dielectric layer 22. Furthermore, the medium inside the opening 23A is different from the medium of the third dielectric layer 23. Thus, light passing through the opening 23A and the slit 22A is diffracted. Therefore, the electrode structure 100A according to the first variation can improve the reflectance, and enhance the light utilization efficiency.

Figure 23:
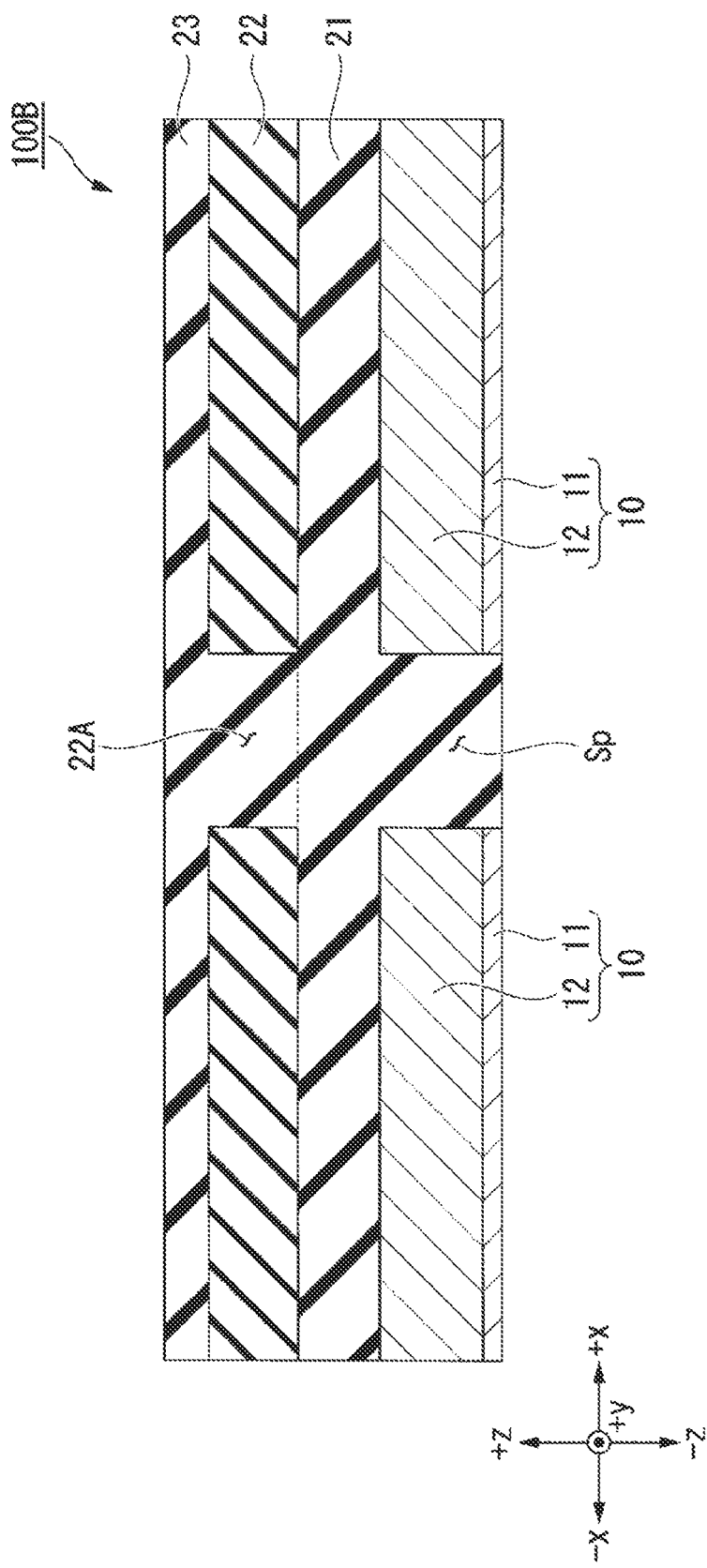
FIG. 23 is a cross-sectional view of an electrode structure according to a second variation.

Furthermore, FIG. 23 is a cross-sectional view of an electrode structure 100B according to a second variation. The electrode structure 100B in FIG. 23 is different from the electrode structure 100A according to the first variation in that the slit 22A is completely filled. Configurations similar to those of the electrode structure 100A are denoted by similar signs, and descriptions thereof are omitted.

The third dielectric layer 23 is formed over the second dielectric layer 22. The third dielectric layer 23 fills the slit 22A. The third dielectric layer 23 has a refractive index lower than that of the second dielectric layer 22. The third dielectric layer 23 may be, for example, an inorganic alignment film such as an alignment film made of polyimide. Resin compositions including polyimide and the like have viscosity before curing, so that the slit 22A is filled.

The medium in the slit 22A (third dielectric layer 23) is different from the medium of the second dielectric layer 22. Therefore, the electrode structure 100B according to the second variation can improve the reflectance, and enhance the light utilization efficiency.

Second Embodiment

Figure 24:
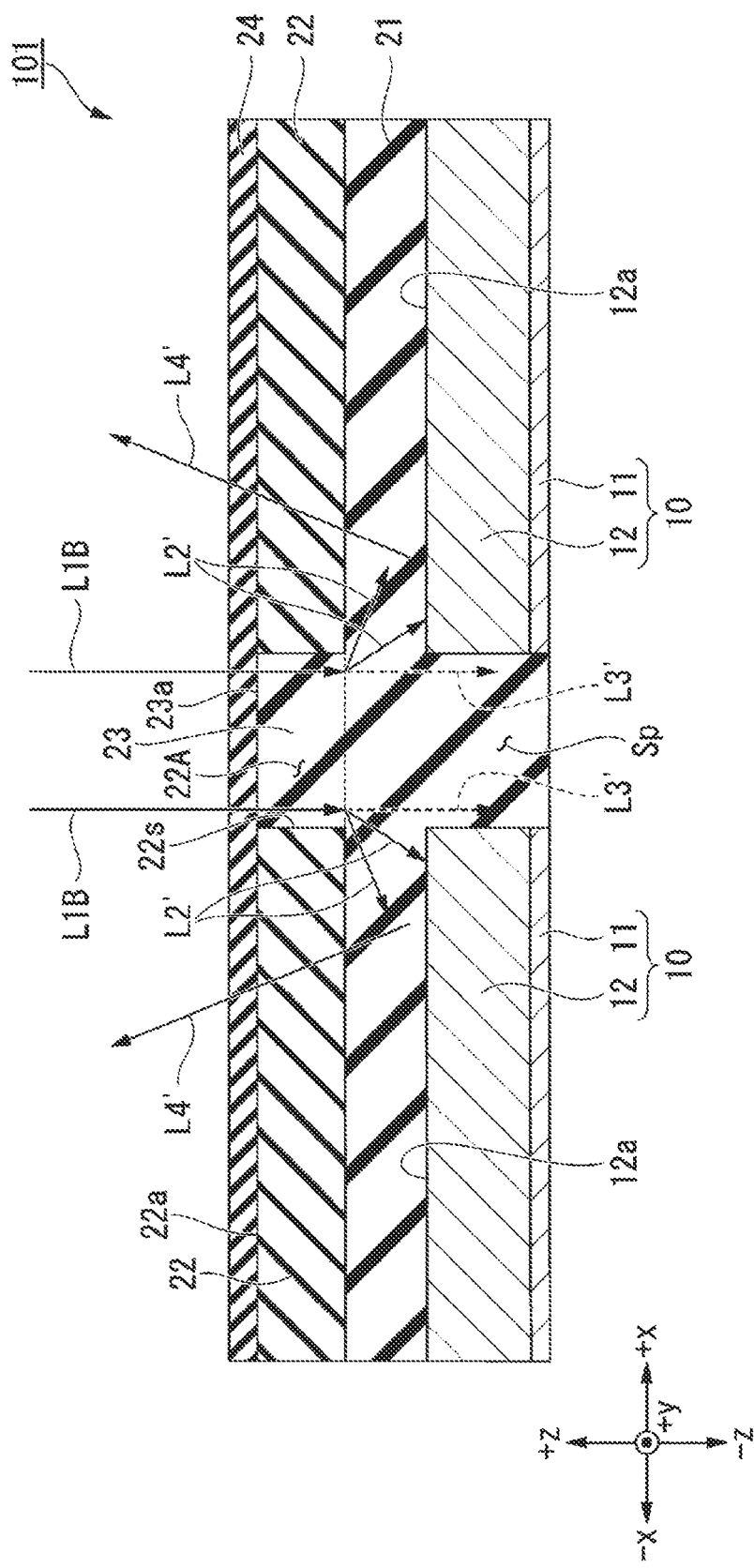
FIG. 24 is a cross-sectional view of an electrode structure according to a second embodiment.

FIG. 24 is a cross-sectional view of an electrode structure 101 according to a second embodiment. The electrode structure 101 according to the second embodiment is different from the electrode structure 100 according to the first embodiment in further including a fourth dielectric layer 24.

Other configurations are the same, and the same configurations are denoted by the same signs, and descriptions thereof will be omitted.

The fourth dielectric layer 24 spreads over first surfaces 22a and 23a of the second dielectric layer 22 and the third dielectric layer 23 on the side far from the first dielectric layer 21. The fourth dielectric layer 24 includes, for example, dielectric material having a refractive index higher than that of the second dielectric layer 22. The fourth dielectric layer 24 is made of, for example, silicon nitride (SiN), tantalum pentoxide ($Ta_2O_5$), hafnium oxide ($HfO_2$), niobium oxide (NbO, $NbO_2$, $Nb_2O_3$, and $Nb_2O_5$), or titanium oxide ($TiO_2$). The difference in refractive index between the fourth dielectric layer 24 and the first dielectric layer 21 is preferably, for example, 0.70 or more.

The electrode structure 101 has the slit 22A in the second dielectric layer 22. A part of the light L1B incident on a position not overlapping the pixel electrode 10 of the electrode structure 101 in the z direction (position overlapping space Sp) becomes diffracted light L2'. Therefore, the electrode structure 101 can improve the reflectance similarly to the electrode structure 100 according to the first embodiment.

Furthermore, the electrode structure 101 can inhibit a difference in reflection intensity for each wavelength. The diffraction angle of the diffracted light L2' differs for each wavelength. For example, light having a large wavelength has a diffraction angle larger than that of light having a small wavelength. The position where the diffracted light L2' is incident on the surface of the pixel electrode 10 differs for each wavelength, and the angle of the light L4' reflected by the pixel electrode 10 also differs for each wavelength. As a result, for example, the intensity of red light may increase at a position inclined by a certain angle from the z direction, and the intensity of blue light may increase at a position inclined by a different angle. The difference in reflection angle for each wavelength can cause color unevenness of an output image.

The electrode structure 101 includes the fourth dielectric layer 24 containing dielectric material having a refractive index higher than that of the second dielectric layer 22. The light L1B is reflected by the surface of the fourth dielectric layer 24 and the interface between the fourth dielectric layer 24 and the third dielectric layer 23 before reaching a diffraction point. That is, the fourth dielectric layer 24 increases reflection interfaces at which the light L1B is reflected. The increase in reflection interfaces decreases an amount of light that reaches the diffraction point, and lowers the intensity of the diffracted light L2'. Decrease in proportion of the diffracted light L2' reduces the ratio of the light L4' in the entire reflected light reflected from the entire electrode structure 101. The light L4' has difference in intensity for each wavelength, and causes color unevenness. A decrease in the ratio of the light L4' in reflected light can inhibit the difference in reflection intensity for each wavelength.

Here, the decrease in intensity of the diffracted light L2' is caused by decrease in amount of light that reaches the diffraction point, and the ratio of the diffracted light L2' and the light L3' has not changed. That is, the decreases in intensity of the diffracted light L2' does not increase the intensity of the light L3'. Therefore, the light utilization efficiency of the electrode structure 101 does not decrease.

Third Embodiment

Figure 25:
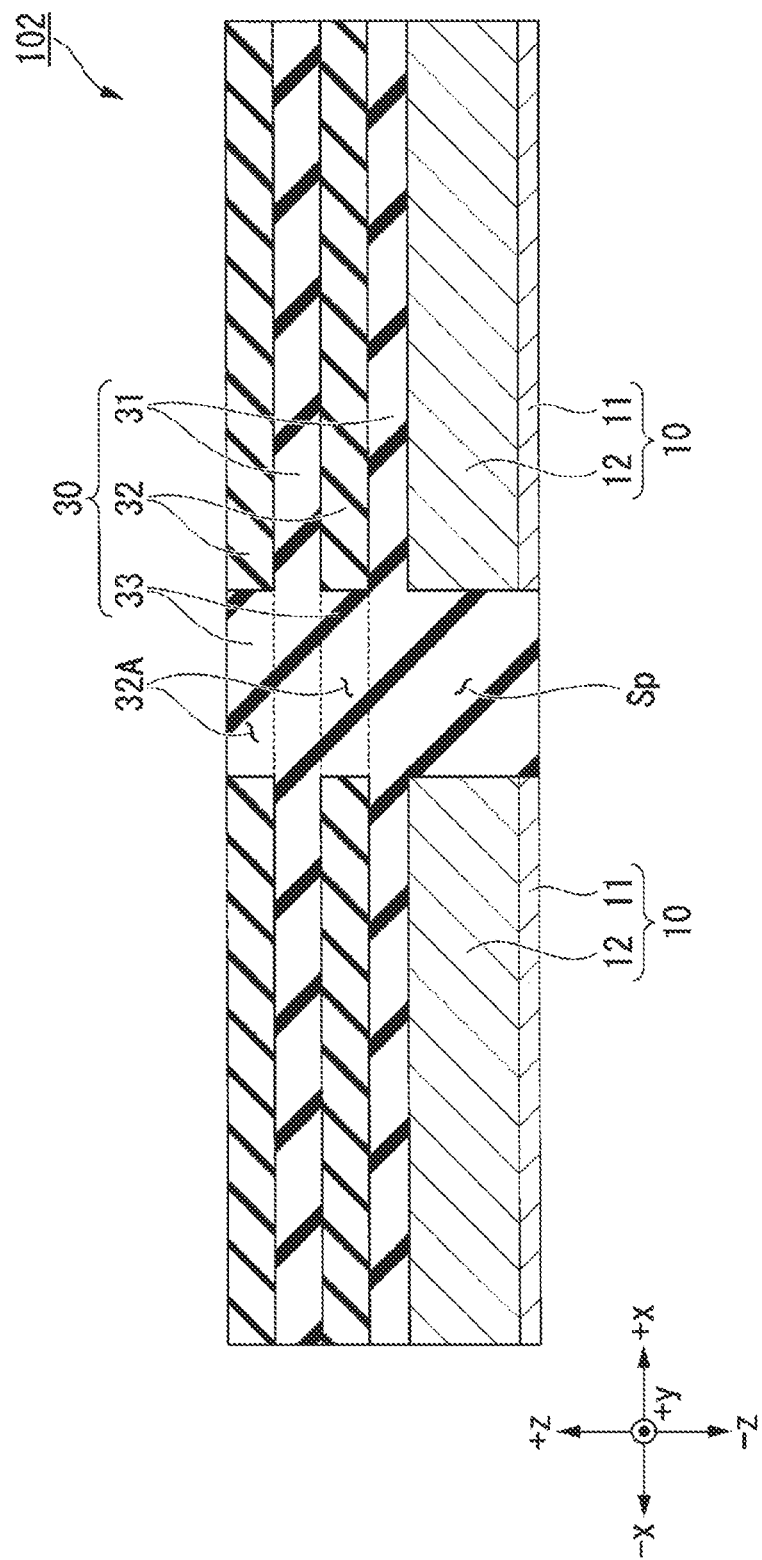
FIG. 25 is a cross-sectional view of an electrode structure according to a third embodiment.

FIG. 25 is a cross-sectional view of an electrode structure 102 according to a third embodiment. The electrode structure 102 according to the third embodiment is different from the electrode structure 100 according to the first embodiment in the configurations of a plurality of dielectric layers 30. Other configurations are the same, and the same configurations are denoted by the same signs, and descriptions thereof will be omitted.

The electrode structure 102 includes the pixel electrode 10 and the plurality of dielectric layers 30. The plurality of dielectric layers 30 includes a plurality of first dielectric layers 31, a plurality of second dielectric layers 32, and a plurality of third dielectric layers 33. The first dielectric layers 31 spread in the xy plane. The second dielectric layers 32 have slits 32A, and spread in the xy plane. The first dielectric layers 31 and the second dielectric layers 32 are alternately laminated in the z direction. The third dielectric layers 33 fill the slits 32A of the second dielectric layers 32. Material, refractive index, and the like of each of the first dielectric layers 31, the second dielectric layers 32, and the third dielectric layers 33 are similar to those of each of the first dielectric layer 21, the second dielectric layer 22, and the third dielectric layer 23 according to the first embodiment.

The electrode structure 102 has the slit 32A in the second dielectric layer 32. The slit 32A diffracts a part of light incident on a position not overlapping the pixel electrode 10 in the z direction (position overlapping space Sp). Therefore, the electrode structure 102 can improve the reflectance similarly to the electrode structure 100 according to the first embodiment.

Furthermore, the electrode structure 102 has a plurality of slits 32A at different height positions in the z direction. Light is diffracted after passing through the slit 32A. The electrode structure 102 according to the third embodiment has more diffraction portions than the electrode structure 100 according to the first embodiment. Therefore, the electrode structure 102 can further inhibit light traveling toward the space Sp between the pixel electrodes 10 among incident light, and can further enhance the light utilization efficiency.

A specific example of the third embodiment has been described in detail. The third embodiment is not limited to this example, and various modifications and changes can be made within the scope of the gist of the present invention set forth in the claims.

Figure 26:
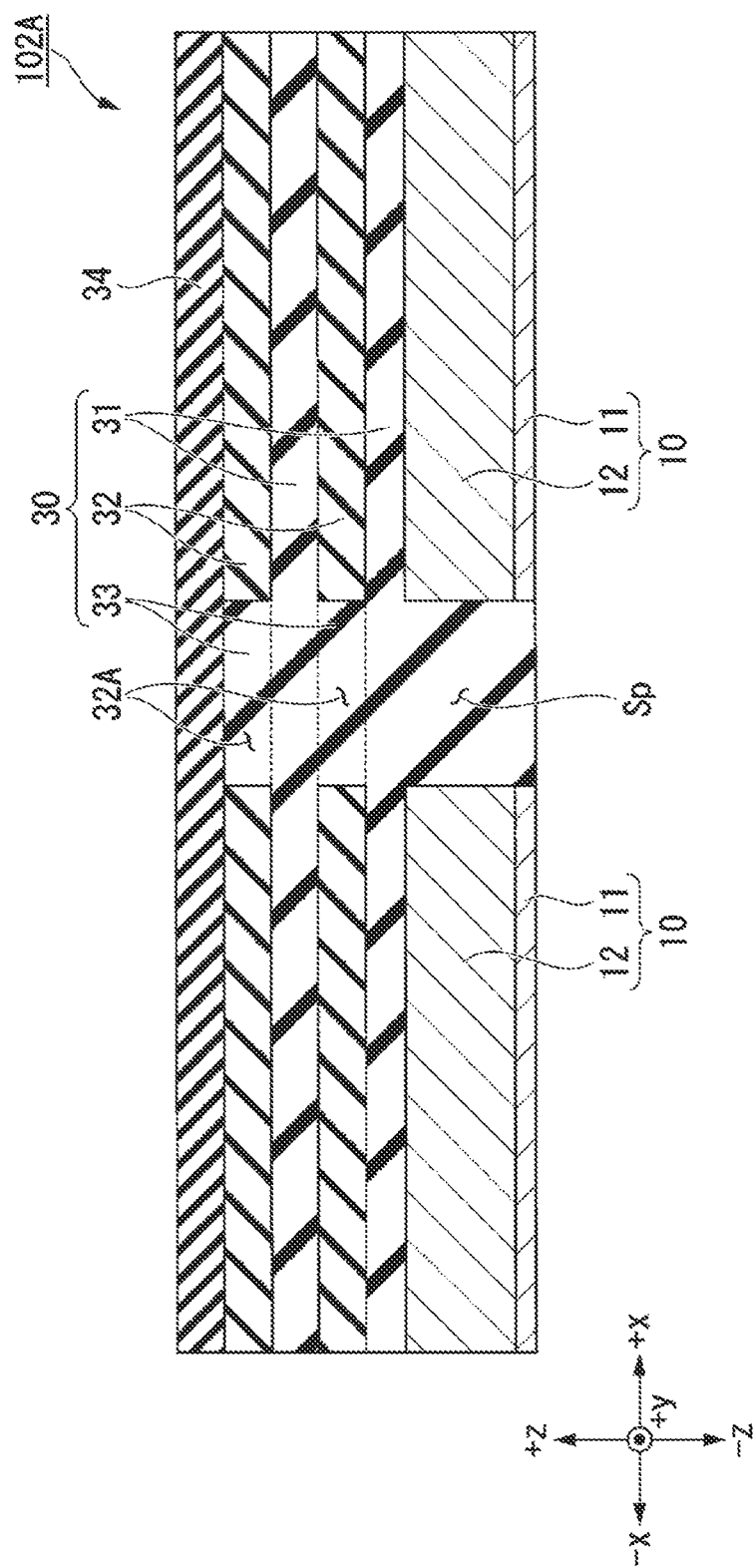
FIG. 26 is a cross-sectional view of an electrode structure according to a third variation.

FIG. 26 is a cross-sectional view of an electrode structure 102A according to a third variation. The electrode structure 102A in FIG. 26 is different from the electrode structure 102 in that a fourth dielectric layer 34 is provided over the second dielectric layer 32. The electrode structure 102A is obtained by combining the features of the electrode structure 101 according to the second embodiment and the features of the electrode structure 102 according to the third embodiment.

The fourth dielectric layer 34 is formed over the second dielectric layer 32 located closest to the +z direction among the plurality of second dielectric layers 32. The fourth dielectric layer 34 is similar to the fourth dielectric layer 24 according to the second embodiment. The fourth dielectric layer 34 is not limited to the example in FIG. 26, and may be formed over another second dielectric layers 32 among the plurality of second dielectric layers 32. That is, the first dielectric layer 31, the second dielectric layer 32, the fourth dielectric layer 34, the first dielectric layer 31, and the second dielectric layer 32 may be laminated in this order at a position overlapping the electrode structure 10.

As in the electrode structure 102, the electrode structure 102A has a plurality of slits 32A at different height positions in the z direction. Light is diffracted after passing through the slit 32A. Therefore, the electrode structure 102A can further inhibit light traveling toward the space Sp between the pixel electrodes 10 among incident light, and can further enhance the light utilization efficiency.

Fourth Embodiment

Figure 27:
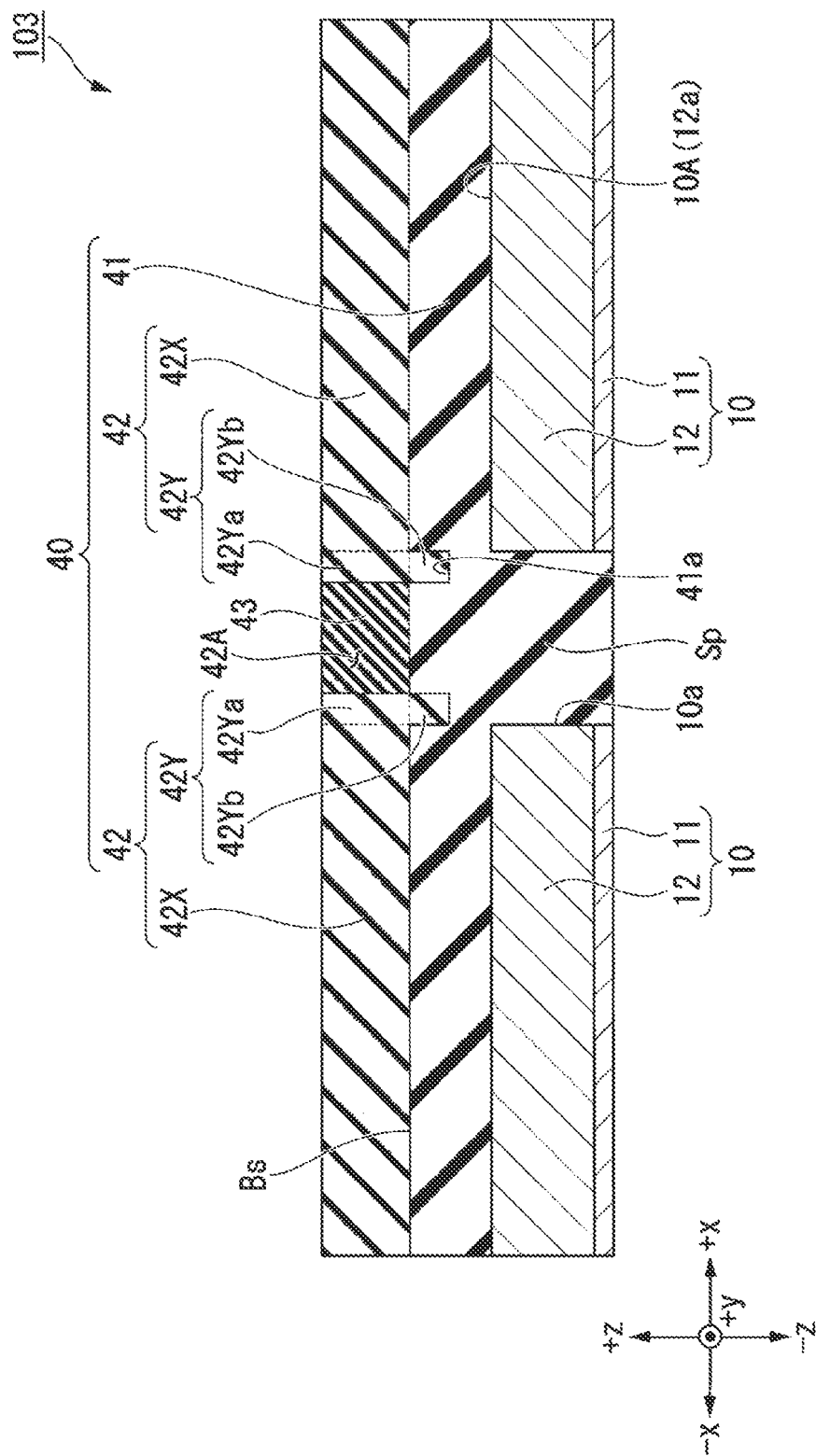
FIG. 27 is a cross-sectional view of an electrode structure according to a fourth embodiment.

FIG. 27 is a cross-sectional view of an electrode structure 103 according to a fourth embodiment. The electrode structure 103 according to the fourth embodiment is different from the electrode structure 100 according to the first embodiment in the configurations of a plurality of dielectric layers 40. Other configurations are the same, and the same configurations are denoted by the same signs, and descriptions thereof will be omitted.

The electrode structure 103 includes the pixel electrode 10 and the plurality of dielectric layers 40. The plurality of dielectric layers 40 includes a first dielectric layer 41, a second dielectric layer 42, and a third dielectric layer 43.

The first dielectric layer 41 spreads in the xy plane. The first dielectric layer 41 has a recess 41a at a position overlapping the space Sp in the z direction. The recess 41a is recessed in the −z direction from a boundary surface Bs along the boundary between the first dielectric layer 41 and the second dielectric layer 42.

The second dielectric layer 42 includes a main body 42X and a protrusion 42Y. The main body 42X overlaps the pixel electrode 10 when viewed from the z direction. The protrusion 42Y is located on the side surface side of the second dielectric layer 42 facing a slit 42A of the main body 42X. The protrusion 42Y is a portion protruding toward the side of the slit 42A with respect to a side surface 10a of the pixel electrode 10 facing the space Sp when viewed from the z direction. The protrusion 42Y protrudes from the side surface 10a of the pixel electrode 10 in the x direction or the y direction in plan view from the z direction. Furthermore, the protrusion 42Y has a protrusion main body 42Ya and an extension 42Yb. The protrusion main body 42Ya is at the same height position in the z direction as the main body 42X. The extension 42Yb protrudes in the −z direction from an interface Bs between the first dielectric layer 41 and the second dielectric layer 42. The extension 42Yb is disposed in the recess 41a of the first dielectric layer 41. The lower end of the extension 42Yb is located at a position in the +z direction from a surface 10A (12a) of the pixel electrode 10.

The third dielectric layer 43 fills the slit 42A of the second dielectric layer 42. Material, refractive index, and the like of each of the first dielectric layers 41, the second dielectric layers 42, and the third dielectric layers 43 are similar to those of each of the first dielectric layer 21, the second dielectric layer 22, and the third dielectric layer 23 according to the first embodiment. The third dielectric layer 43 may be, for example, an inorganic alignment film such as an inorganic alignment film made of silicon oxide, an organic alignment film such as an organic alignment film made of polyimide, or the like.

The electrode structure 103 has the slit 42A in the second dielectric layer 42. The slit 42A diffracts a part of light incident on a position not overlapping the pixel electrode 10 in the z direction (position overlapping space Sp). Therefore, the electrode structure 103 can improve the reflectance similarly to the electrode structure 100 according to the first embodiment.

Furthermore, the electrode structure 103 has the protrusion 42Y. The protrusion 42Y increases diffraction. Furthermore, the protrusion 42Y has the extension 42Yb. The extension 42Yb also increases diffraction. Therefore, the electrode structure 103 can further inhibit light traveling toward the space Sp between the pixel electrodes 10 among incident light, and can further enhance the light utilization efficiency.

A specific example of the fourth embodiment has been described in detail. The fourth embodiment is not limited to this example, and various modifications and changes can be made within the scope of the gist of the present invention set forth in the claims.

Figure 28:
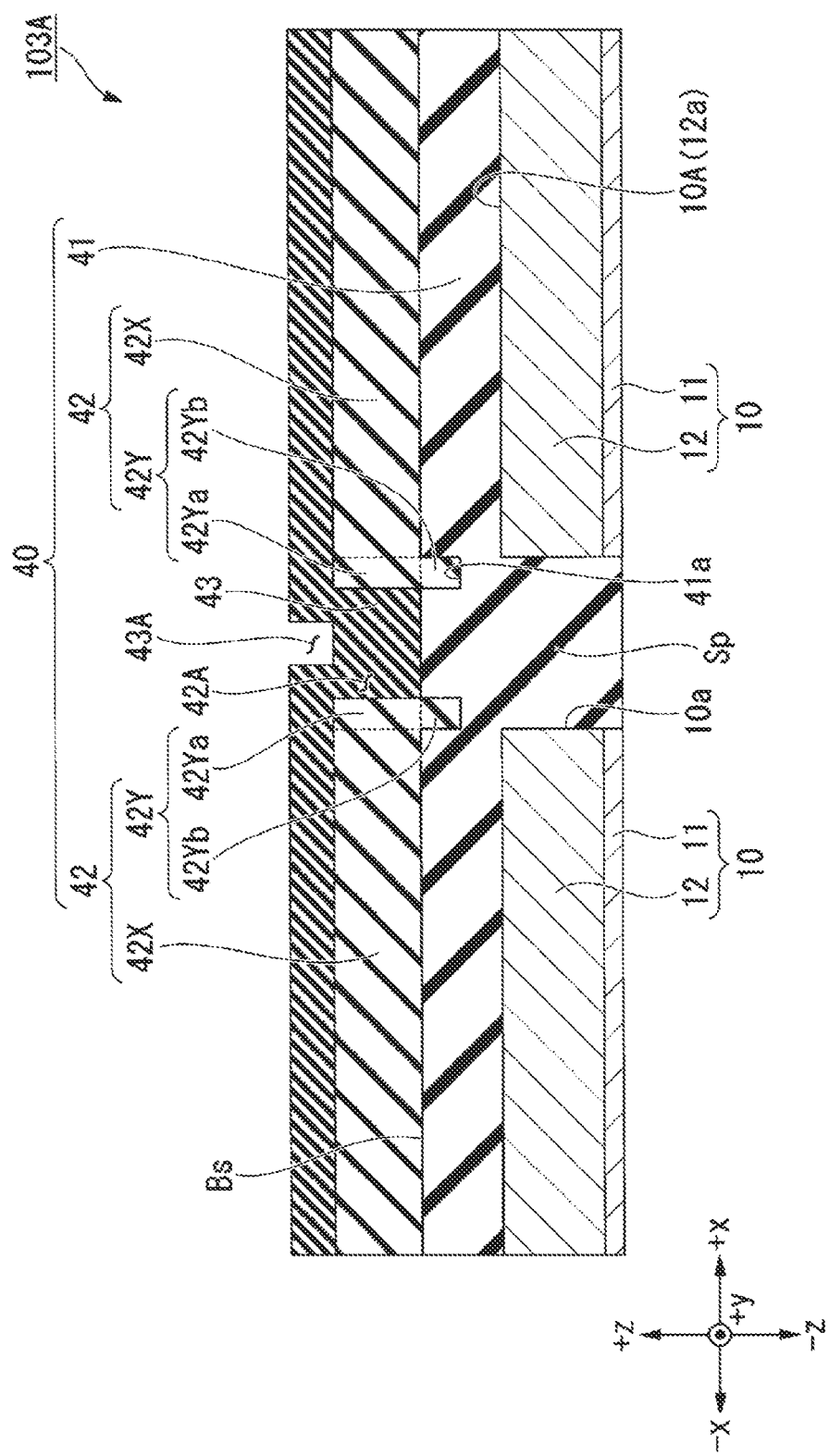
FIG. 28 is a cross-sectional view of an electrode structure according to a fourth variation.

FIG. 28 is a cross-sectional view of an electrode structure 103A according to a fourth variation. The electrode structure 103A in FIG. 28 is different from the electrode structure 103 in that the third dielectric layer 43 spreads over the second dielectric layer 42. Configurations similar to those of the electrode structure 103 are denoted by similar signs, and descriptions thereof are omitted.

The third dielectric layer 43 is formed along the surface of the second dielectric layer 42. The surface of the third dielectric layer 43 reflects the shape of the surface of the second dielectric layer 42 in which the slit 42A is formed. The third dielectric layer 43 has an opening 43A in a portion overlapping the slit 42A.

The electrode structure 103A has effects similar to those of the electrode structure 103, and can improve the reflectance. The electrode structure 103A is obtained by combining the features of the electrode structure 103 according to the fourth embodiment and the features of the electrode structure 100A according to the first variation.

Figure 29:
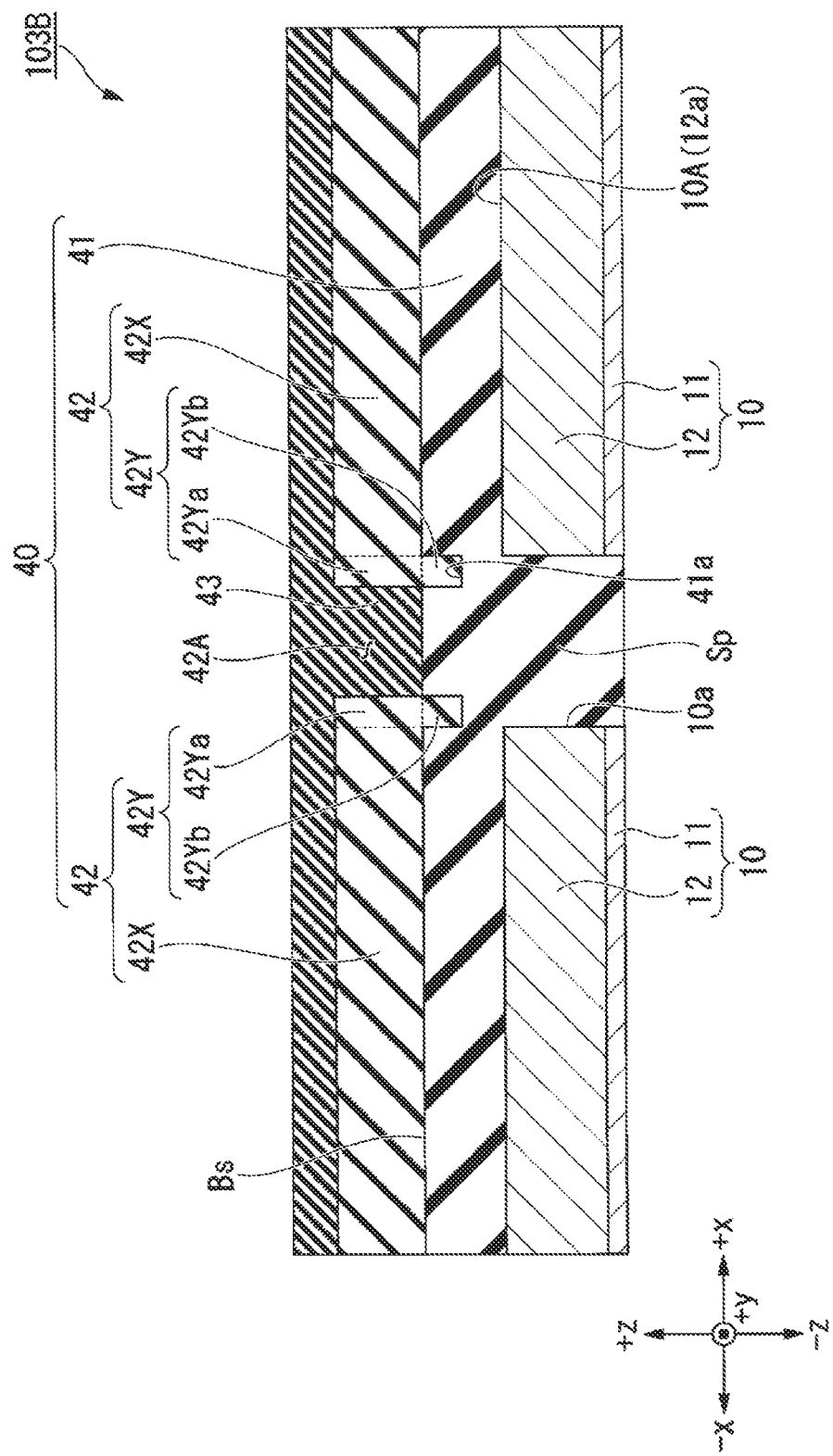
FIG. 29 is a cross-sectional view of an electrode structure according to a fifth variation.

Furthermore, FIG. 29 is a cross-sectional view of an electrode structure 103B according to a fifth variation. The electrode structure 103B in FIG. 29 is different from the electrode structure 103A according to the fifth variation in that the third dielectric layer 43 does not have the opening 43A. Configurations similar to those of the electrode structure 103A are denoted by similar signs, and descriptions thereof are omitted.

The third dielectric layer 43 is formed over the second dielectric layer 42. The surface of the third dielectric layer 43 in the +z direction is flattened without depending on the shape of the surface of the second dielectric layer 42 in which the slit 42A is formed. The fourth dielectric layer 43 may be, for example, an inorganic alignment film such as an alignment film made of polyimide. Resin compositions including polyimide and the like have viscosity before curing, so that the opening 43A is filled.

The electrode structure 103B has effects similar to those of the electrode structure 103, and can improve the reflectance. The electrode structure 103B is obtained by combining the features of the electrode structure 103 according to the fourth embodiment and the features of the electrode structure 100B according to the second variation.

Fifth Embodiment

Figure 30:
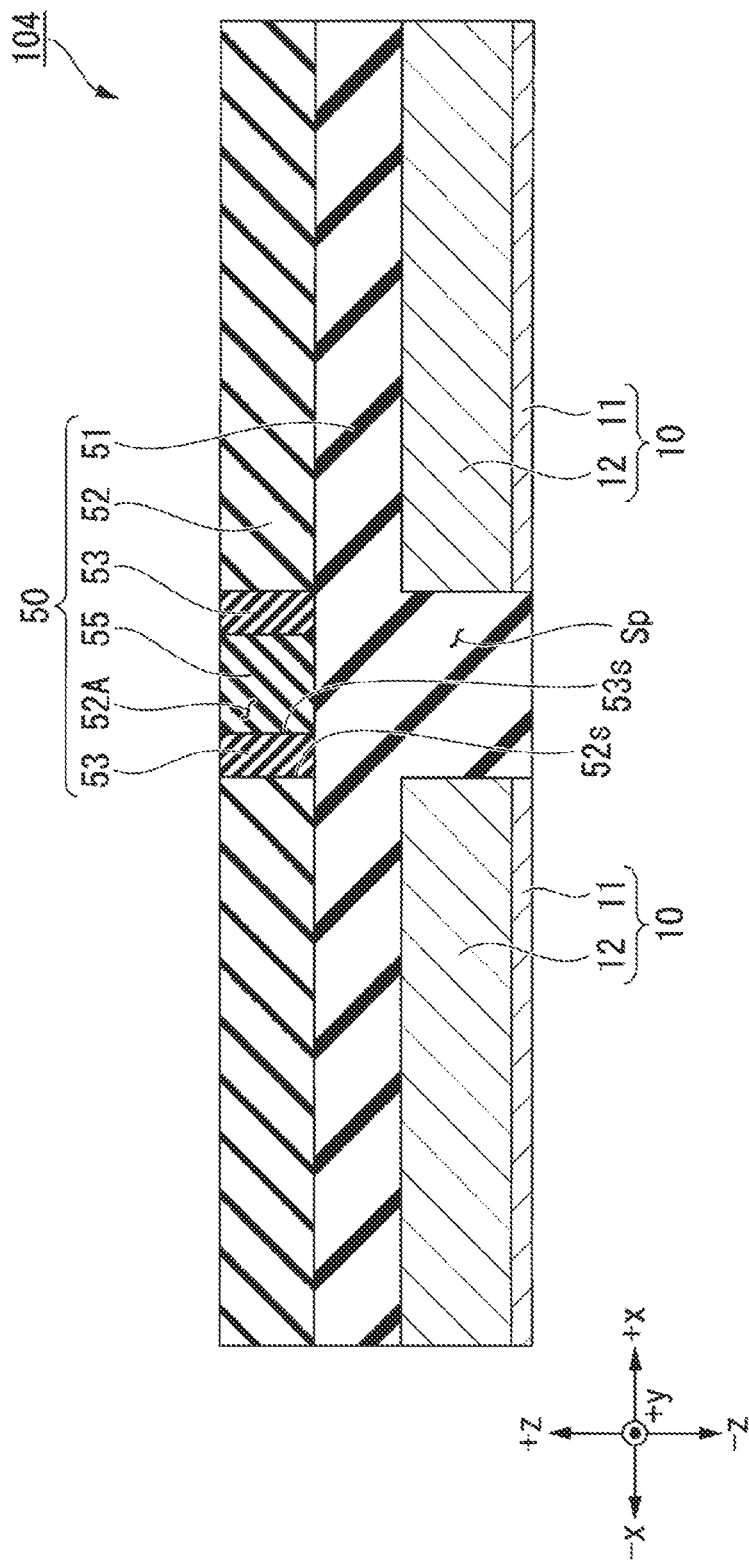
FIG. 30 is a cross-sectional view of an electrode structure according to a fifth embodiment.

FIG. 30 is a cross-sectional view of an electrode structure 104 according to a fifth embodiment. The electrode structure 104 according to the fifth embodiment is different from the electrode structure 100 according to the first embodiment in the configurations of a plurality of dielectric layers 50. Other configurations are the same, and the same configurations are denoted by the same signs, and descriptions thereof will be omitted.

The electrode structure 104 includes the pixel electrode 10 and the plurality of dielectric layers 50. The plurality of dielectric layers 50 includes a first dielectric layer 51, a second dielectric layer 52, a third dielectric layer 53, and a fifth dielectric layer 55.

The first dielectric layer 51 spreads in the xy plane. The second dielectric layers 52 have a slit 52A, and spreads in the xy plane. The third dielectric layer 53 is in contact with a side surface 52s of the second dielectric layer 52 in which the slit 52A is formed. The third dielectric layer 53 fills a part of the slit 52A, for example. Material, refractive index, and the like of each of the first dielectric layers 51, the second dielectric layers 52, and the third dielectric layers 53 are similar to those of each of the first dielectric layer 21, the second dielectric layer 22, and the third dielectric layer 23 according to the first embodiment.

The fifth dielectric layer 55 is in contact with an inner surface 53s of the third dielectric layer 53. The fifth dielectric layer 55 fills a part of the slit 52A, for example. The fifth dielectric layer 55 has a refractive index higher than that of the third dielectric layer 53. The fifth dielectric layer 55 can be made of, for example, material similar to that of the second dielectric layer 52, and may include the same material as that of the second dielectric layer 52.

The electrode structure 104 has the slit 52A in the second dielectric layer 52. The slit 52A diffracts a part of light incident on a position not overlapping the pixel electrode 10 in the z direction (position overlapping space Sp). Therefore, the electrode structure 104 can improve the reflectance similarly to the electrode structure 100 according to the first embodiment.

Furthermore, the electrode structure 104 includes the fifth dielectric layer 55 having a refractive index higher than that of the third dielectric layer 53 inside the third dielectric layer 53. A portion having a different refractive index provided in the slit 52A can increase the number of diffraction points, and increase diffracted light. Light slows down in a medium having a high refractive index. Thus, light easily passes through the third dielectric layer 53 having a refractive index lower than those of the second dielectric layer 52 and the fifth dielectric layer 55. That is, from the viewpoint of incident light, the third dielectric layer 53 can be regarded as a plurality of slits. Increase in the number of slits increases the number of diffraction points and diffracted light. Therefore, the electrode structure 104 can further inhibit light traveling toward the space Sp between the pixel electrodes 10 among incident light, and can further enhance the light utilization efficiency.

A specific example of the fifth embodiment has been described in detail. The fifth embodiment is not limited to this example, and various modifications and changes can be made within the scope of the gist of the present invention set forth in the claims.

For example, although an example in which the third dielectric layer 53 and the fifth dielectric layer 55 fill the slit 52A has been described in the fifth embodiment, a larger number of dielectric layers may fill the slit 52A. In this case, a medium having a low refractive index and a medium having a high refractive index are preferably arranged alternately from a position close to the second dielectric layer 52 when viewed from the z direction.

Figure 31:
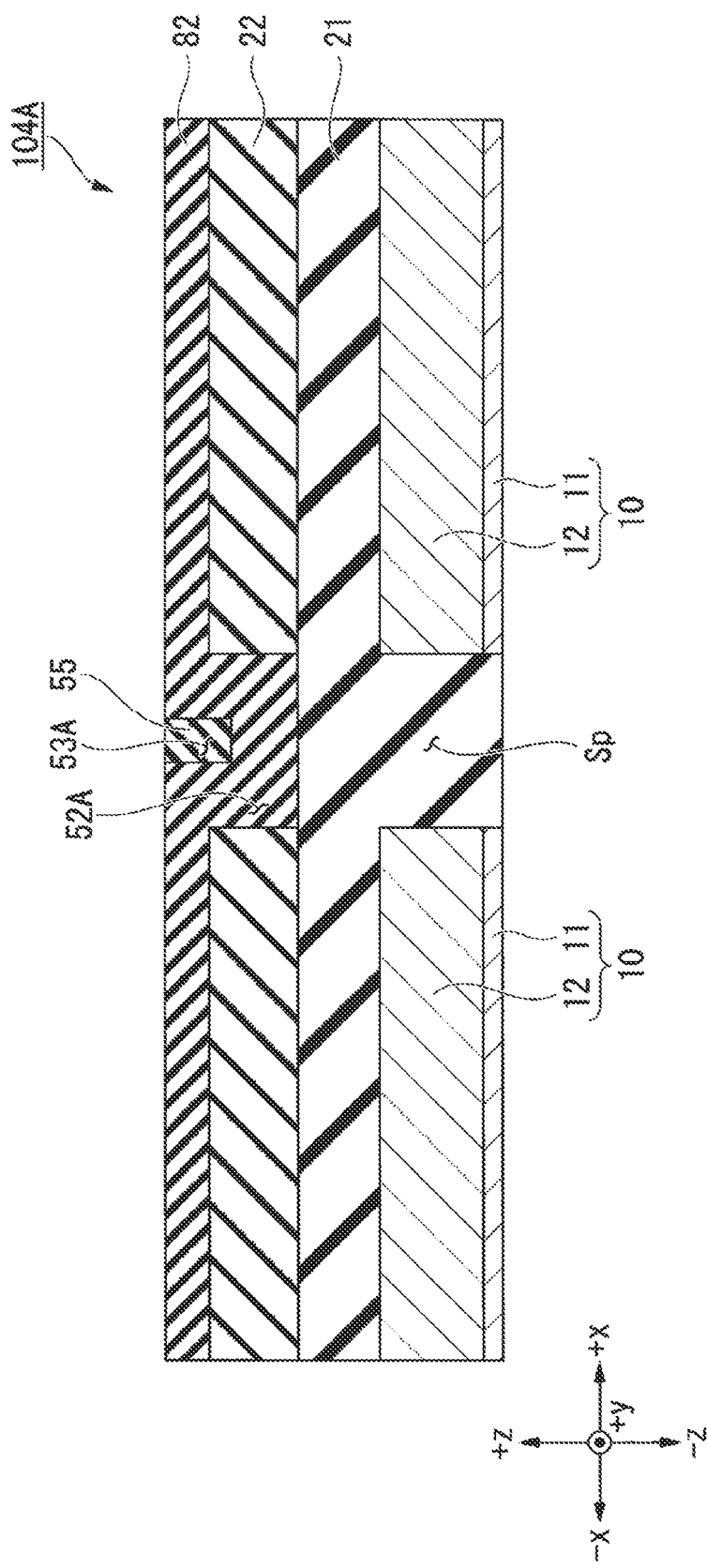
FIG. 31 is a cross-sectional view of an electrode structure according to a sixth variation.

Furthermore, FIG. 31 is a cross-sectional view of an electrode structure 104A according to the fifth variation. The electrode structure 104A in FIG. 31 is different from the electrode structure 104 in that the third dielectric layer 53 spreads over the second dielectric layer 52 and the fifth dielectric layer 55 fills an opening 53A of the third dielectric layer 53. Configurations similar to those of the electrode structure 104 are denoted by similar signs, and descriptions thereof are omitted.

The third dielectric layer 53 is formed along the surface of the second dielectric layer 52. The surface of the third dielectric layer 53 reflects the shape of the surface of the second dielectric layer 52 in which the slit 52A is formed. The third dielectric layer 53 has an opening 53A in a portion overlapping the slit 52A. The fifth dielectric layer 55 fills the opening 53A.

The electrode structure 104A has effects similar to those of the electrode structure 104, and can improve the reflectance. The electrode structure 104A is obtained by combining the features of the electrode structure 104 according to the fifth embodiment and the features of the electrode structure 100A according to the first variation.

Sixth Embodiment

Figure 32:
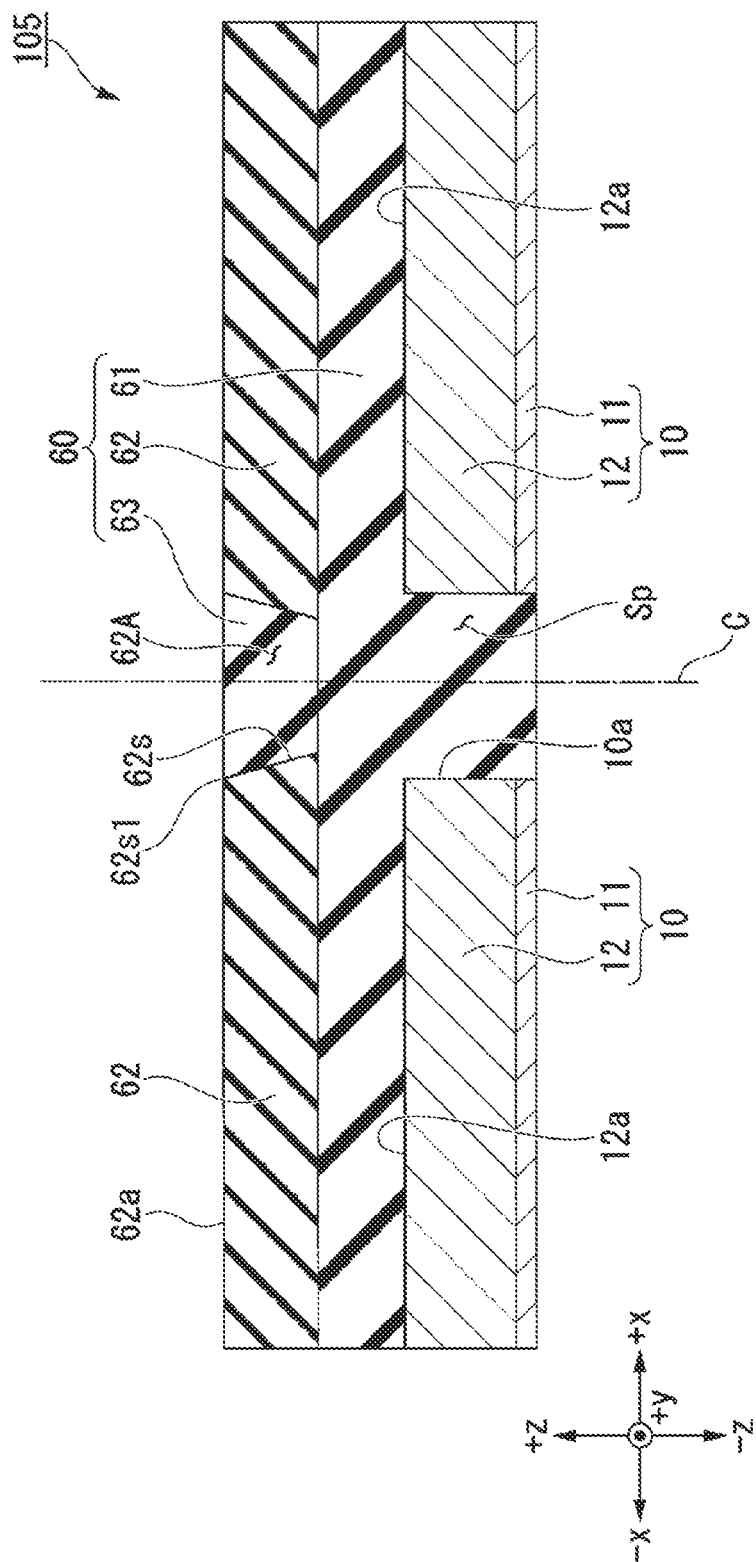
FIG. 32 is a cross-sectional view of an electrode structure according to a sixth embodiment.

FIG. 32 is a cross-sectional view of an electrode structure 105 according to a sixth embodiment. The electrode structure 105 according to the sixth embodiment is different from the electrode structure 100 according to the first embodiment in the shape of a side surface 62s of a second dielectric layer 62. Other configurations are the same, and the same configurations are denoted by the same signs, and descriptions thereof will be omitted.

The electrode structure 105 includes the pixel electrode 10 and a plurality of dielectric layers 60. The plurality of dielectric layers 60 includes a first dielectric layer 61, the second dielectric layer 62, and a third dielectric layer 63.

The first dielectric layer 61 spreads in the xy plane. The second dielectric layers 62 have a slit 62A, and spreads in the xy plane. The third dielectric layer 63 is in contact with the side surface 62s of the second dielectric layer 62 in which the slit 62A is formed. Material, refractive index, and the like of each of the first dielectric layers 61, the second dielectric layers 62, and the third dielectric layers 63 are similar to those of each of the first dielectric layer 21, the second dielectric layer 22, and the third dielectric layer 23 according to the first embodiment.

At least a part of the side surface 62s of the second dielectric layer 62 is inclined with respect to the z direction. The side surface 62s inclines in a direction away from a center line C between the pixel electrodes 10 with distance from the pixel electrode 10 in the z direction. The widths of the slit 62A in the x direction and the y direction is widened with distance from the pixel electrode 10.

For example, a boundary point 62s 1 between a first surface 62a in the +z direction of the second dielectric layer 62 and the side surface 62s is located closer to the center line C than the side surface 10a of the pixel electrode 10 facing the space Sp.

The electrode structure 105 has the slit 62A in the second dielectric layer 62. The slit 62A diffracts a part of light incident on a position not overlapping the pixel electrode 10 in the z direction (position overlapping space Sp). Therefore, the electrode structure 105 can improve the reflectance similarly to the electrode structure 100 according to the first embodiment.

Furthermore, in the electrode structure 105, the side surface 62s of the second dielectric layer 62 is inclined. The side surface 62s bends light incident from the third dielectric layer 63 to the second dielectric layer 62 toward the side of the pixel electrode 10. As a result, the ratio of light reflected the by pixel electrode 10 increases. Furthermore, when the boundary point 62s 1 is located closer to the center line C than the side surface 10a of the pixel electrode 10, a part of the second dielectric layer 62 protrudes to the side surface 10a of the pixel electrode 10, and diffraction increases. Therefore, the electrode structure 105 can further inhibit light traveling toward the space Sp between the pixel electrodes 10 among incident light, and can further enhance the light utilization efficiency.

Note that, although an example in which the entire side surface 62s is inclined has been described in the sixth embodiment, a part of the side surface 62s may be inclined. Furthermore, the inclination angle of the inclined surface with respect to the z direction is not limited to a constant angle, and may change. For example, a part of the side surface 62 may be curved, and have curvature.

Seventh Embodiment

Figure 33:
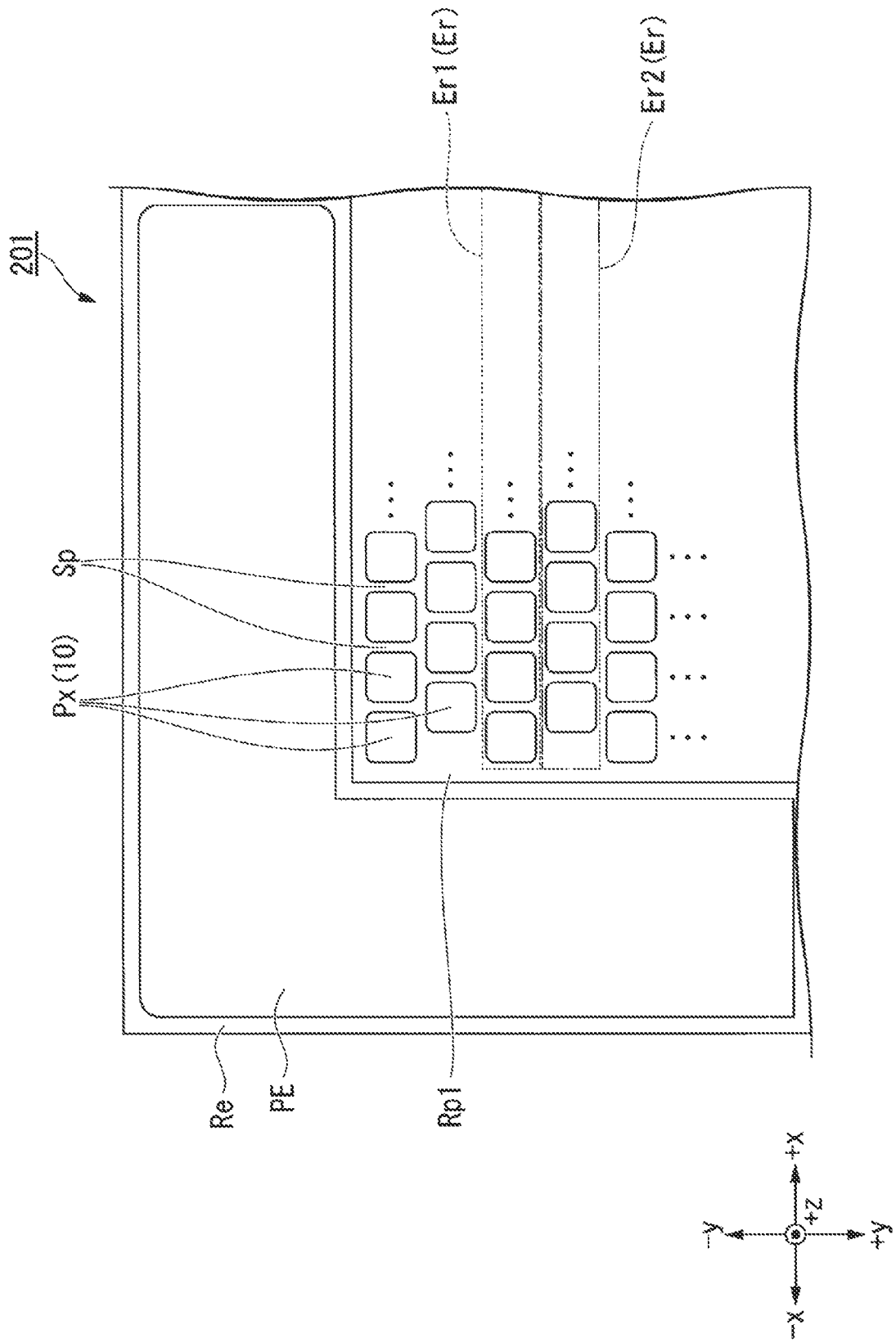
FIG. 33 is a plan view of a liquid crystal display device according to a seventh embodiment.

FIG. 33 is a plan view of a liquid crystal display device 201 according to a seventh embodiment. The liquid crystal display device 201 according to the seventh embodiment is different from the liquid crystal display device 200 according to the first embodiment in the arrangement of the pixels Px in a pixel region Rp1. Other configurations are the same, and the same configurations are denoted by the same signs, and descriptions thereof will be omitted.

The liquid crystal display device 201 has the pixel region Rp1 and the peripheral region Re. In the pixel region Rp1, a plurality of pixels Px is formed. The pixel region Rp1 has a plurality of electrode rows Er in the y direction. In the electrode rows Er, pixels Px are arranged in the x direction. The peripheral region Re surrounds the pixel region Rp1 in plan view from the z direction.

Any electrode row among the plurality of electrode rows Er is referred to as a first electrode row Er1, and an electrode row adjacent to the first electrode row Er1 in the y direction is referred to as a second electrode row Er2. In the first electrode row Er1 and the second electrode row Er2, pixels Px and pieces of space Sp are alternately arranged in the x direction. The pixel Px (pixel electrode 10) of the first electrode row Er1 is located at a position overlapping the space Sp of the second electrode row Er2 in the y direction. Furthermore, the pixel Px (pixel electrode 10) of the second electrode row Er2 is located at a position overlapping the space Sp of the first electrode row Er1 in the y direction. That is, in the first electrode row Er1 and the second electrode row Er2, positions of the pixels Px (pixel electrodes 10) are shifted from each other in the x direction. The plurality of pixels Px (pixel electrodes 10) is arranged in zigzags in the y direction. The plurality of pixels Px (pixel electrodes 10) is arranged in a staggered arrangement, for example.

As described above, light incident on the space Sp is not reflected, which causes a decrease in light utilization efficiency. Therefore, when an area occupied by the space Sp in the pixel region Rp1 is small, the light utilization efficiency is improved. The corners of the plurality of pixels Px may have an arc shape due to processing accuracy. For example, as illustrated in FIG. 2, when the positions in the x direction and the y direction of the adjacent pixels Px coincide with each other, the region surrounded by the four pixels Px causes a decrease in the light utilization efficiency. This is because the distance between the pixels Px adjacent in an oblique direction is larger than the distance between the pixels Px adjacent the x direction and the y direction.

When the positions of the pixels Px of the first electrode row Er1 and the second electrode row Er2 in the x direction are shifted by a half pitch as in the liquid crystal display device 201 according to the seventh embodiment, the region surrounded by four pixels Px is not formed. Therefore, an area occupied by the space Sp in the pixel region Rp1 can be reduced, and the light utilization efficiency of the liquid crystal display device 201 can be improved.

Furthermore, each pixel Px includes, for example, the electrode structure 100 according to the first embodiment. Thus, the liquid crystal display device 201 according to the seventh embodiment has effects similar to those of the electrode structure 100 according to the first embodiment.

Figure 34:
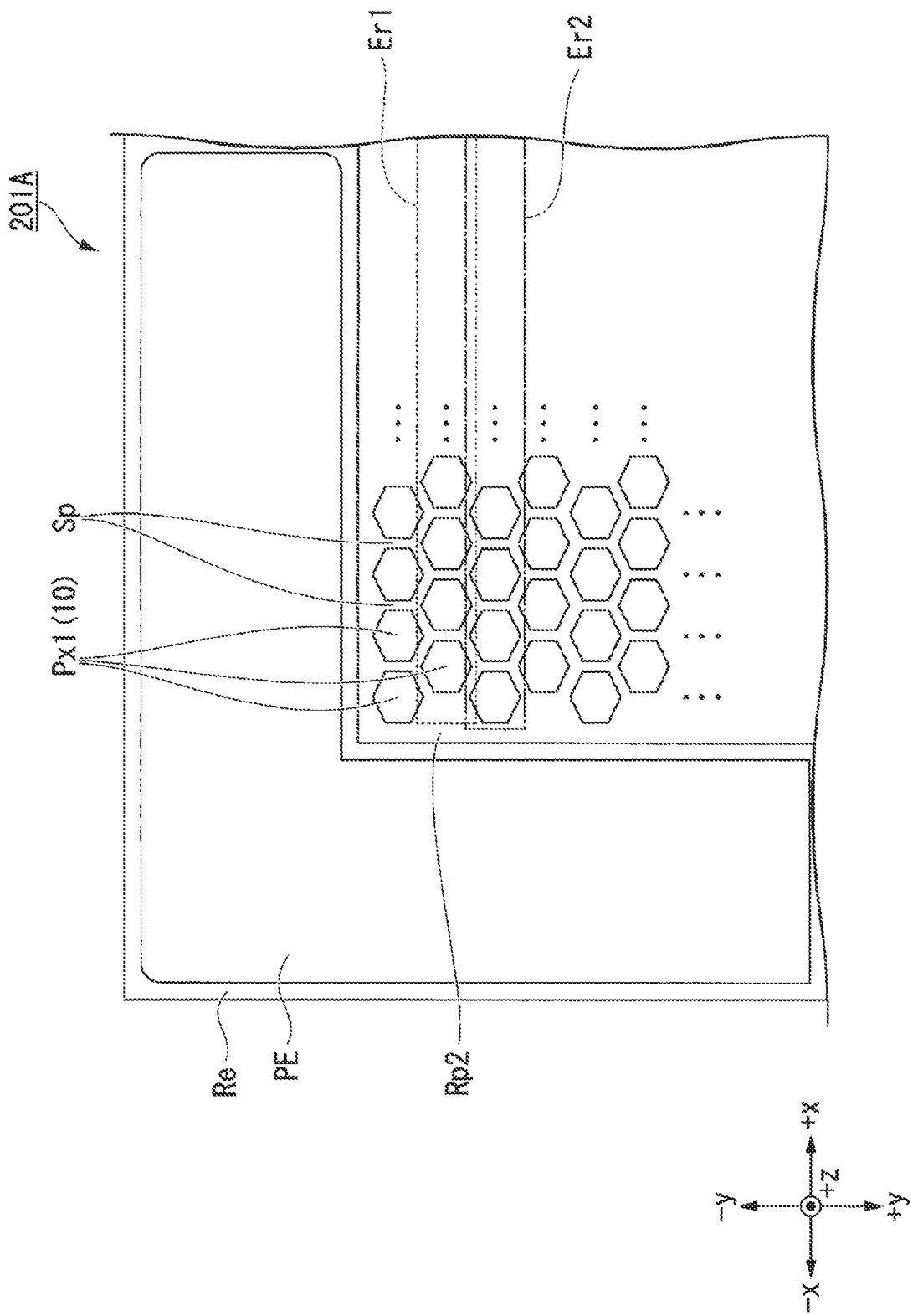
FIG. 34 is a plan view of a liquid crystal display device according to a sixth variation.

Furthermore, FIG. 34 is a plan view of a liquid crystal display device 201A according to a sixth variation. The liquid crystal display device 201A according to the sixth variation is different from the liquid crystal display device 201 in FIG. 33 in the shape of a pixel Px1 in a pixel region Rp2. Other configurations are the same, and the same configurations are denoted by the same signs, and descriptions thereof will be omitted.

The pixels Px1 have a hexagonal shape when viewed from the z direction. The pixels Px1 are arranged in a hexagonal closest-packed manner when viewed from the z direction. The pixels Px1 arranged in a closest-packed manner can reduce an area occupied by the space Sp in the pixel region Rp2. Therefore, the liquid crystal display device 201A according to the sixth variation has excellent light utilization efficiency.

Note that, although an example in which the pixels Px have a rectangular or hexagonal shape has been described in the seventh embodiment, the shape of the pixels Px is not limited thereto.

Eighth Embodiment

Figure 35:
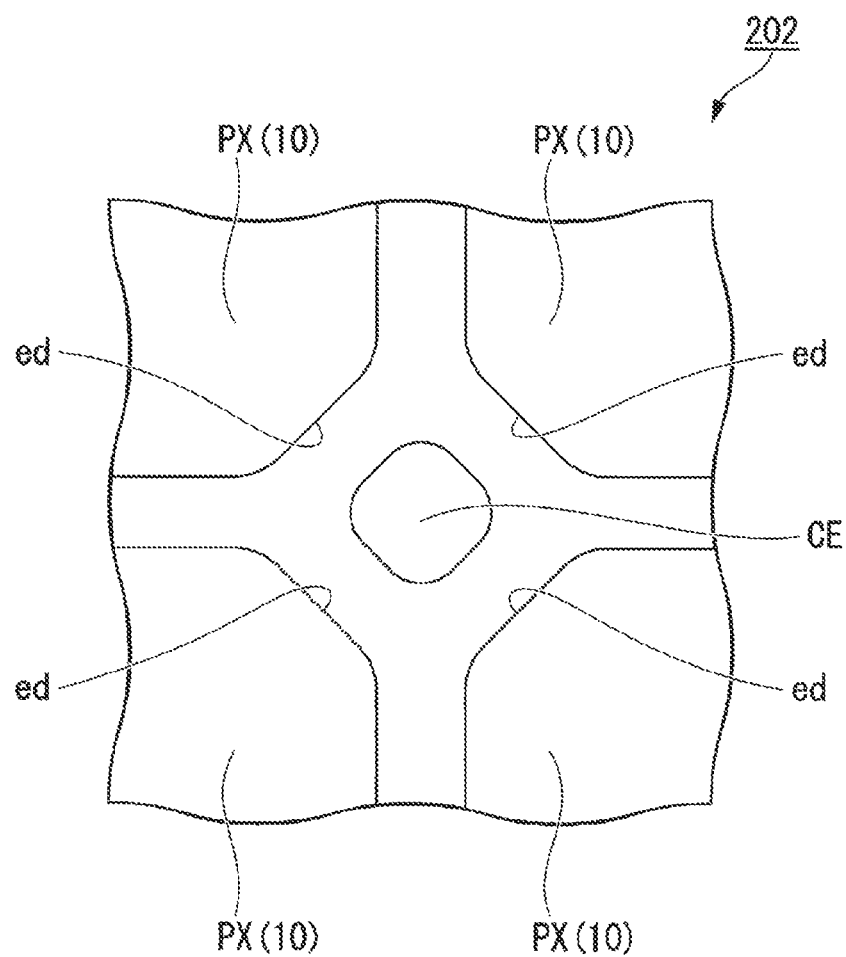
FIG. 35 is a plan view of a main part of a liquid crystal display device according to an eighth embodiment.

FIG. 35 is a plan view of a main part of a liquid crystal display device 202 according to an eighth embodiment. The liquid crystal display device 202 according to the eighth embodiment is different from the liquid crystal display device 200 according to the first embodiment in that a corner electrode CE is provided in a region surrounded by four pixels Px (pixel electrodes 10). Other configurations are the same, and the same configurations are denoted by the same signs, and descriptions thereof will be omitted.

The liquid crystal display device 202 has a pixel region and a peripheral region. FIG. 35 is an enlarged view of a part of the pixel region. In the pixel region, the pixels Px are arranged in the x direction and the y direction.

The corner electrode CE is provided in, for example, a region surrounded by corners ed of four pixels Px. The corner electrode CE includes, for example, materials similar to those of the pixel electrode 10. The corner electrode CE is only required to have a reflection function. The corner electrode CE may be a floating electrode which is not connected to the pixel circuit 220 and has an independent potential. Furthermore, the corner electrode CE may be connected to the ground to generate capacitance between the corner electrode CE and the pixel electrode.

As described above, the region surrounded by four pixels Px causes a decrease in light utilization efficiency. The corner electrode CE provided in the region surrounded by four pixels Px can reduce the area ratio occupied by space in the pixel region, and improve light utilization efficiency.

Furthermore, each pixel Px includes, for example, the electrode structure 100 according to the first embodiment. Thus, the liquid crystal display device 202 according to the eighth embodiment has effects similar to those of the electrode structure 100 according to the first embodiment.

Note that, as illustrated in FIG. 33, when the positions of the pixels Px of the first electrode row Er1 and the second electrode row Er2 in the x direction are shifted by a half pitch, the corner electrode may be provided in a region surrounded by three pixels Px.

Ninth Embodiment

FIG. 36 is a plan view of a liquid crystal display device 203 according to a ninth embodiment. The liquid crystal display device 203 according to the ninth embodiment is different from the liquid crystal display device 200 according to the first embodiment in the configuration of a peripheral region Re1. Other configurations are the same, and the same configurations are denoted by the same signs, and descriptions thereof will be omitted.

The liquid crystal display device 203 has the pixel region Rp and the peripheral region Re1. The peripheral region Re1 has a plurality of peripheral electrodes PE1. In the peripheral region Re1, the peripheral electrodes PE1 are arranged in the x direction and the y direction. The size (area) of each of the peripheral electrodes PE1 is substantially the same as the size (area) of each of the pixel electrodes 10. Here, the term "substantially the same" means that blurring within 15% with respect to the area of the pixel electrode 10 is permitted.

When the electrode structure 100 is produced, a planarization process for planarizing a surface may be performed. The process of removing a portion located in the +z direction from the second dielectric layer 22 among the dielectric layers 96 in the first, third, fourth, and fifth manufacturing methods (see FIGS. 7, 12, and 15) is one example of the planarization process. Furthermore, the process of removing the laminated conductive layers in the sixth manufacturing method until a part of the insulating layer 97 is exposed (see FIG. 19) is also one example of the planarization process. The planarization process is performed by, for example, CMP.

The planarization process is often performed at a time over the pixel region Rp and the peripheral region Re1. When the pattern density of the pixel Px in the pixel region Rp is different from the pattern density of the peripheral electrode PE1 in the peripheral region Re1, the speed of the planarization processing changes between in the pixel region Rp and in the peripheral region Re1. As a result, there is a case where the planarization processing in the pixel region Rp does not proceed on the peripheral region Re1, or conversely, the electrode structure 100 in the pixel region Rp may be excessively polished. The excessive polishing causes film peeling of each of the laminated layers.

The peripheral electrode PE1 in the peripheral region Re1 is patterned by using photolithography or the like. The processing on the pixel electrode 10 in the pixel region Rp and the processing on the peripheral electrode PE1 in the peripheral region Re1 may be simultaneously performed, or may be divided as separate processes.

Furthermore, the peripheral region Re1 may have a connection portion Cp between adjacent peripheral electrodes PE1 when viewed from the z direction. The connection portion Cp is provided at, for example, a position over each corner of the four peripheral electrodes PE1. The connection portion Cp is not limited to this case as long as the plurality of peripheral electrodes PE1 can be electrically connected.

The peripheral electrode PE1 is electrically connected to the common electrode 235. The plurality of peripheral electrodes PE1 electrically connected to each other eliminates the need to provide the plug wire 222 and the wire 221 for each peripheral electrodes PE1.

Furthermore, each pixel Px includes, for example, the electrode structure 100 according to the first embodiment. Thus, the liquid crystal display device 203 according to the ninth embodiment has effects similar to those of the electrode structure 100 according to the first embodiment.

The present disclosure is not limited to the above-described embodiments, and various modifications and changes can be made within the scope of the gist of the present disclosure set forth in the claims. For example, characteristic components in each of the embodiments may be combined.

Furthermore, the effects set forth in the specification are merely examples and not limitations. Other effects may be exhibited.

Note that the content of the present disclosure may have configurations as follows.

(1)
An electrode structure comprising:
a plurality of pixel electrodes arranged separately from each other; and
a plurality of dielectric layers laminated in a first direction with respect to the plurality of pixel electrodes,
wherein the plurality of dielectric layers includes:
a first dielectric layer that spreads over the plurality of pixel electrodes in a direction intersecting with the first direction; and
a second dielectric layer that includes dielectric material having a refractive index higher than that of the first dielectric layer, sandwiches the first dielectric layer together with the plurality of pixel electrodes, and has a slit at a position overlapping space between pixel electrodes adjacent when viewed from the first direction.

(2)
The electrode structure according to (1), wherein at least a part of a side surface facing the slit of the second dielectric layer is inclined with respect to the first direction.

(3)
The electrode structure according to (1) or (2), further comprising a third dielectric layer that includes dielectric material having a refractive index lower than that of the second dielectric layer and fills at least a part of the slit.

(4)
The electrode structure according to (3), further comprising a fourth dielectric layer that includes dielectric material having a refractive index higher than that of the second dielectric layer and spreads over the second dielectric layer and the third dielectric layer.

(5)
The electrode structure according to (3) or (4), further comprising a fifth dielectric layer, wherein the third dielectric layer includes an opening, and the fifth dielectric layer includes dielectric material having a refractive index higher than that of the third dielectric layer, and fills the opening.

(6)
The electrode structure according to any one of (1) to (5), wherein the plurality of dielectric layers includes a plurality of the first dielectric layers and a plurality of the second dielectric layers, and
the first dielectric layers and the second dielectric layers are alternately laminated in the first direction.

(7)
The electrode structure according to (6), further comprising a fourth dielectric layer that includes dielectric material having a refractive index higher than that of the second dielectric layer and spreads over any of the plurality of second dielectric layers.

(8)
The electrode structure according to any one of (1) to (7), wherein the second dielectric layer includes a protrusion that protrudes toward the slit with respect to a side surface of a pixel electrode facing the space when viewed from the first direction on a side surface of the second dielectric layer facing the slit.

(9)

The electrode structure according to (8), wherein a part of the protrusion extends in the first dielectric layer.

(10)

The electrode structure according to any one of (1) to (9), wherein the plurality of pixel electrodes includes a plurality of electrode rows in which pixel electrodes are arranged in a second direction intersecting with the first direction, the plurality of electrode rows includes a first electrode row and a second electrode row alternately arranged in a third direction orthogonal to the second direction, and when viewed from the third direction, a pixel electrode included in the first electrode row and a pixel electrode included in the second electrode row are shifted in the second direction.

(11)

The electrode structure according to (10), wherein each of the plurality of pixel electrodes has a rectangular or hexagonal shape when viewed from the first direction.

(12)

The electrode structure according to any one of (1) to (11), further comprising a corner electrode in a region surrounded by three or more pixel electrodes when viewed from the first direction.

(13)

The electrode structure according to any one of (1) to (12), further comprising:

a pixel region in which the plurality of pixel electrodes is formed; and a peripheral region that surrounds the pixel region when viewed from the first direction, wherein the peripheral region includes a plurality of peripheral electrodes, and each of the plurality of peripheral electrodes has substantially a same size as that of each of the pixel electrodes.

(14)

The electrode structure according to (13), further comprising a connection portion that connects adjacent peripheral electrodes.

(15)

A liquid crystal display device comprising: the electrode structure according to any one of (1) to (14); a common electrode facing the electrode structure; a liquid crystal layer located between the electrode structure and the common electrode; and an alignment film located between the liquid crystal layer and the electrode structure.

(16)

A projective display device comprising: the liquid crystal display device according to (15); and a light source that applies light to the liquid crystal display device from the common electrode toward the electrode structure.

(17)

A method of manufacturing an electrode structure, comprising the steps of:

sequentially forming a conductive layer, a first dielectric layer, and a second dielectric layer including dielectric material having a refractive index higher than that of the first dielectric layer;

forming a through hole that penetrates at least the second dielectric layer among the conductive layer, the first dielectric layer, and the second dielectric layer; and filling the through hole with a third dielectric layer including dielectric material having a refractive index lower than that of the second dielectric layer.

(18)

The method of manufacturing an electrode structure according to (17), including:

further forming a sacrificial layer including the same material as the third dielectric layer on a surface opposite to the first dielectric layer of the second dielectric layer; and forming a through hole through the second dielectric layer and the sacrificial layer when the through hole is formed.

(19)

A method of manufacturing an electrode structure, comprising the steps of:

forming an insulating layer and forming a recess in the insulating layer;

filling the recess with a conductive layer;

sequentially forming a first dielectric layer and a second dielectric layer including dielectric material having a refractive index higher than that of the first dielectric layer on the insulating layer and the conductive layer;

forming a slit in the second dielectric layer; and filling the slit with a third dielectric layer including dielectric material having a refractive index lower than that of the second dielectric layer.

REFERENCE SIGNS LIST 10, 15 PIXEL ELECTRODE
20, 30, 40, 50, 60 PLURALITY OF DIELECTRIC LAYERS
21, 31, 41, 51, 61 FIRST DIELECTRIC LAYER
22, 32, 42, 52, 62 SECOND DIELECTRIC LAYER
22A, 32A, 42A, 52A, 62A SLIT
22s, 52s, 62s SIDE SURFACE
23, 33, 43, 53 THIRD DIELECTRIC LAYER
24 FOURTH DIELECTRIC LAYER
42Y PROTRUSION
42Yb EXTENSION
53s INNER SURFACE
55 FIFTH DIELECTRIC LAYER
81 SACRIFICIAL LAYER
91, 92 CONDUCTIVE LAYER
93, 94, 96, 99 DIELECTRIC LAYER
97 INSULATING LAYER
97A RECESS
100, 100A, 100B, 101, 102, 102A, 103, 103A, 103B, 104, 104A, 105 ELECTRODE STRUCTURE
200, 200R, 200G, 200B, 201, 201A, 202, 203 LIQUID CRYSTAL DISPLAY DEVICE
233 LIQUID CRYSTAL LAYER
235 COMMON ELECTRODE
300 PROJECTIVE DISPLAY DEVICE
301 LIGHT SOURCE
Bs BOUNDARY SURFACE
CE CORNER ELECTRODE
Cp CONNECTION PORTION
Er ELECTRODE ROW
Er1 FIRST ELECTRODE ROW
Er2 SECOND ELECTRODE ROW
PE, PE1 PERIPHERAL ELECTRODE
Px, Px1 PIXEL
Re, Re1 PERIPHERAL REGION
Rp, Rp1, Rp2 PIXEL REGION
H, H1, H2 HOLE

The invention claimed is:

1. An electrode structure, comprising:
a plurality of pixel electrodes arranged separately from each other; and
a plurality of dielectric layers laminated in a first direction with respect to the plurality of pixel electrodes,
wherein the plurality of dielectric layers includes:
a first dielectric layer that spreads over the plurality of pixel electrodes in a direction intersecting with the first direction;
a second dielectric layer that includes a dielectric material having a refractive index higher than that of the first dielectric layer, wherein
the first dielectric layer is between the second dielectric layer and the plurality of pixel electrodes, and
the second dielectric layer has a slit at a position overlapping space between adjacent pixel electrodes of the plurality of pixel electrodes when viewed from the first direction; and
a third dielectric layer in at least a part of the slit, wherein
the third dielectric layer is in direct contact with the first dielectric layer, and
the third dielectric layer includes a dielectric material having a refractive index lower than that of the second dielectric layer.

2. The electrode structure according to claim 1, wherein at least a part of a side surface facing the slit of the second dielectric layer is inclined with respect to the first direction.

3. The electrode structure according to claim 1, wherein the plurality of dielectric layers further includes a fourth dielectric layer that includes a dielectric material having a refractive index higher than that of the second dielectric layer and spreads over the second dielectric layer and the third dielectric layer.

4. The electrode structure according to claim 1, wherein the plurality of dielectric layers further includes a fifth dielectric layer,
the third dielectric layer includes an opening, and
the fifth dielectric layer includes a dielectric material having a refractive index higher than that of the third dielectric layer, and fills the opening.

5. The electrode structure according to claim 1, wherein the plurality of dielectric layers further includes a plurality of first dielectric layers and a plurality of second dielectric layers, and
the plurality of first dielectric layers and the plurality of second dielectric layers are alternately laminated in the first direction.

6. The electrode structure according to claim 5, wherein the plurality of dielectric layers further includes a fourth dielectric layer that includes a dielectric material having a refractive index higher than that of the second dielectric layer and spreads over at least one of the plurality of second dielectric layers.

7. The electrode structure according to claim 1, wherein the second dielectric layer further includes a protrusion that protrudes toward the slit with respect to a side surface of a pixel electrode of the plurality of pixel electrodes when viewed from the first direction,
the side surface of the pixel electrode faces the position overlapping space, and
the protrusion is on a side surface of the second dielectric layer facing the slit.

8. The electrode structure according to claim 7, wherein a part of the protrusion extends in the first dielectric layer.

9. The electrode structure according to claim 1, wherein the plurality of pixel electrodes includes a plurality of electrode rows in which pixel electrodes are arranged in a second direction intersecting with the first direction,
the plurality of electrode rows includes a first electrode row and a second electrode row alternately arranged in a third direction orthogonal to the second direction, and
when viewed from the third direction, a pixel electrode included in the first electrode row and a pixel electrode included in the second electrode row are shifted in the second direction.

10. The electrode structure according to claim 9, wherein each of the plurality of pixel electrodes has one of a rectangular or hexagonal shape when viewed from the first direction.

11. The electrode structure according to claim 1, further comprising a corner electrode in a region surrounded by three or more pixel electrodes of the plurality of pixel electrodes when viewed from the first direction.

12. The electrode structure according to claim 1, further comprising:
a pixel region that includes the plurality of pixel electrodes; and
a peripheral region that surrounds the pixel region when viewed from the first direction, wherein
the peripheral region includes a plurality of peripheral electrodes, and
each of the plurality of peripheral electrodes has substantially a same size as that of each of the plurality of pixel electrodes.

13. The electrode structure according to claim 12, further comprising a connection portion that connects adjacent peripheral electrodes of the plurality of peripheral electrodes.

14. A liquid crystal display device, comprising:
the electrode structure according to claim 1;
a common electrode facing the electrode structure;
a liquid crystal layer between the electrode structure and the common electrode; and
an alignment film between the liquid crystal layer and the electrode structure.

15. A projective display device, comprising:
the liquid crystal display device according to claim 14; and
a light source configured to apply light to the liquid crystal display device from the common electrode toward the electrode structure.

16. A method of manufacturing an electrode structure, comprising:
sequentially forming a conductive layer, a first dielectric layer, and a second dielectric layer including a dielectric material having a refractive index higher than that of the first dielectric layer;
forming a through hole that penetrates at least the second dielectric layer among the conductive layer, the first dielectric layer, and the second dielectric layer; and
filling the through hole with a third dielectric layer including a dielectric material having a refractive index lower than that of the second dielectric layer,
wherein the third dielectric layer is in direct contact with the first dielectric layer.

17. The method of manufacturing the electrode structure according to claim 16, further comprising:
forming a sacrificial layer on a surface opposite to the first dielectric layer of the second dielectric layer;
forming the through hole through the second dielectric layer and the sacrificial layer; and removing the sacrificial layer.

18. A method of manufacturing an electrode structure, comprising:
- forming an insulating layer and forming a recess in the insulating layer;
- filling the recess with a conductive layer;
- sequentially forming, on the insulating layer and the conductive layer, a first dielectric layer and a second dielectric layer including a dielectric material having a refractive index higher than that of the first dielectric layer;
- forming a slit in the second dielectric layer; and
- filling the slit with a third dielectric layer including a dielectric material having a refractive index lower than that of the second dielectric layer,
  - wherein the third dielectric layer is in direct contact with the first dielectric layer.

\* \* \* \* \*